April 18, 1939.  J. B. GETZ ET AL  2,155,186
MACHINERY FOR MAKING WIRE FENCING
Filed Aug. 3, 1938  14 Sheets-Sheet 12
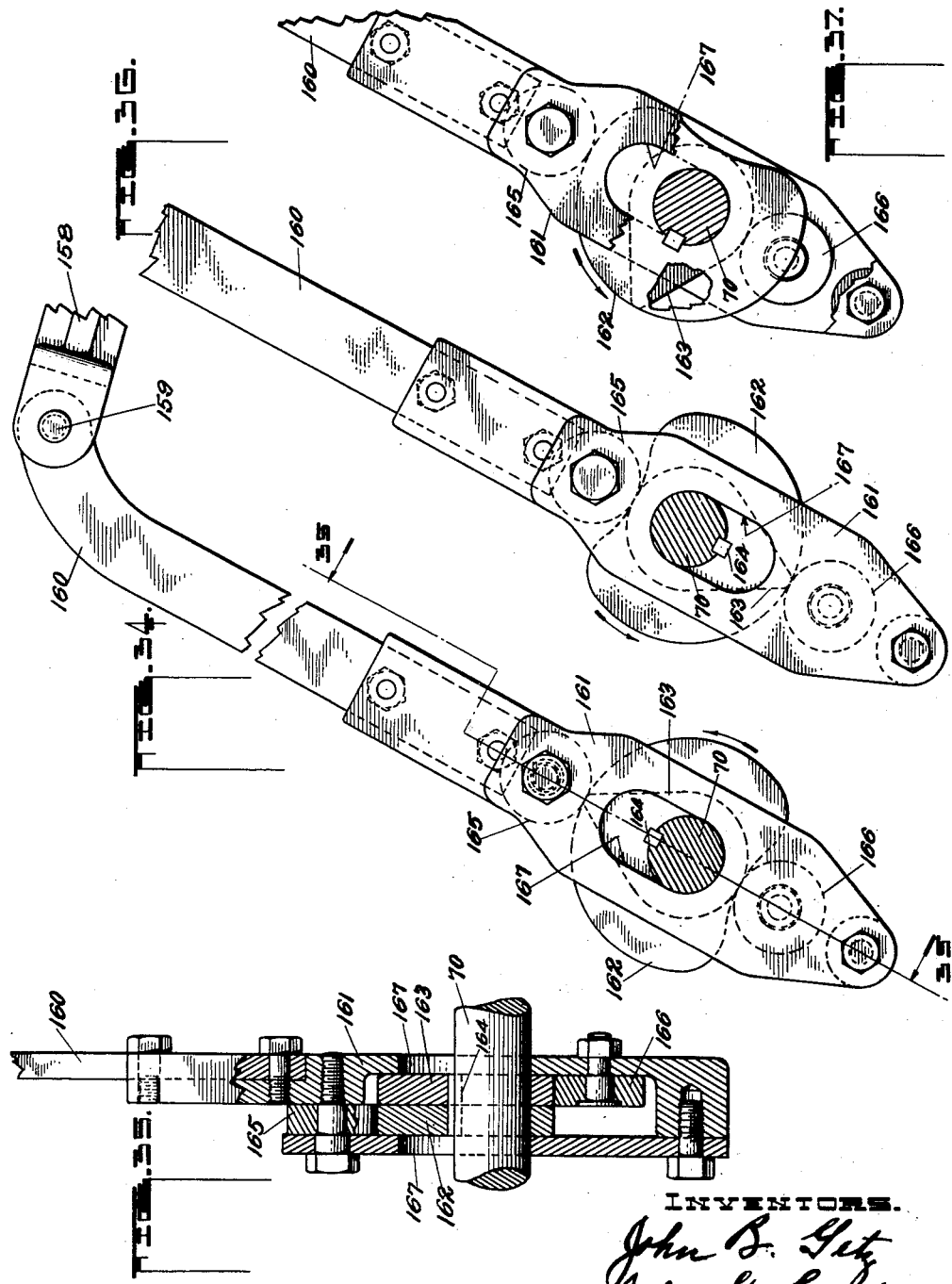

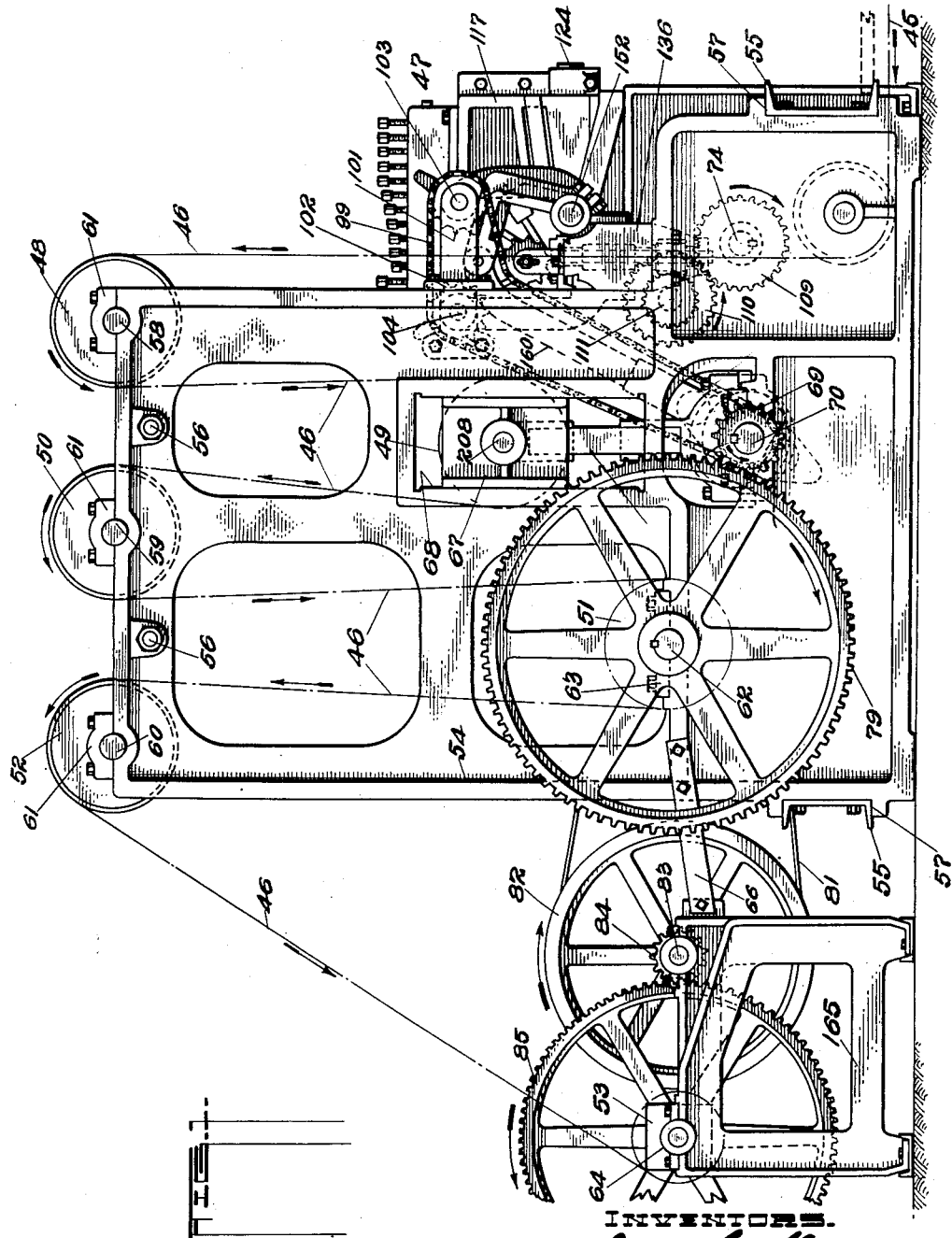

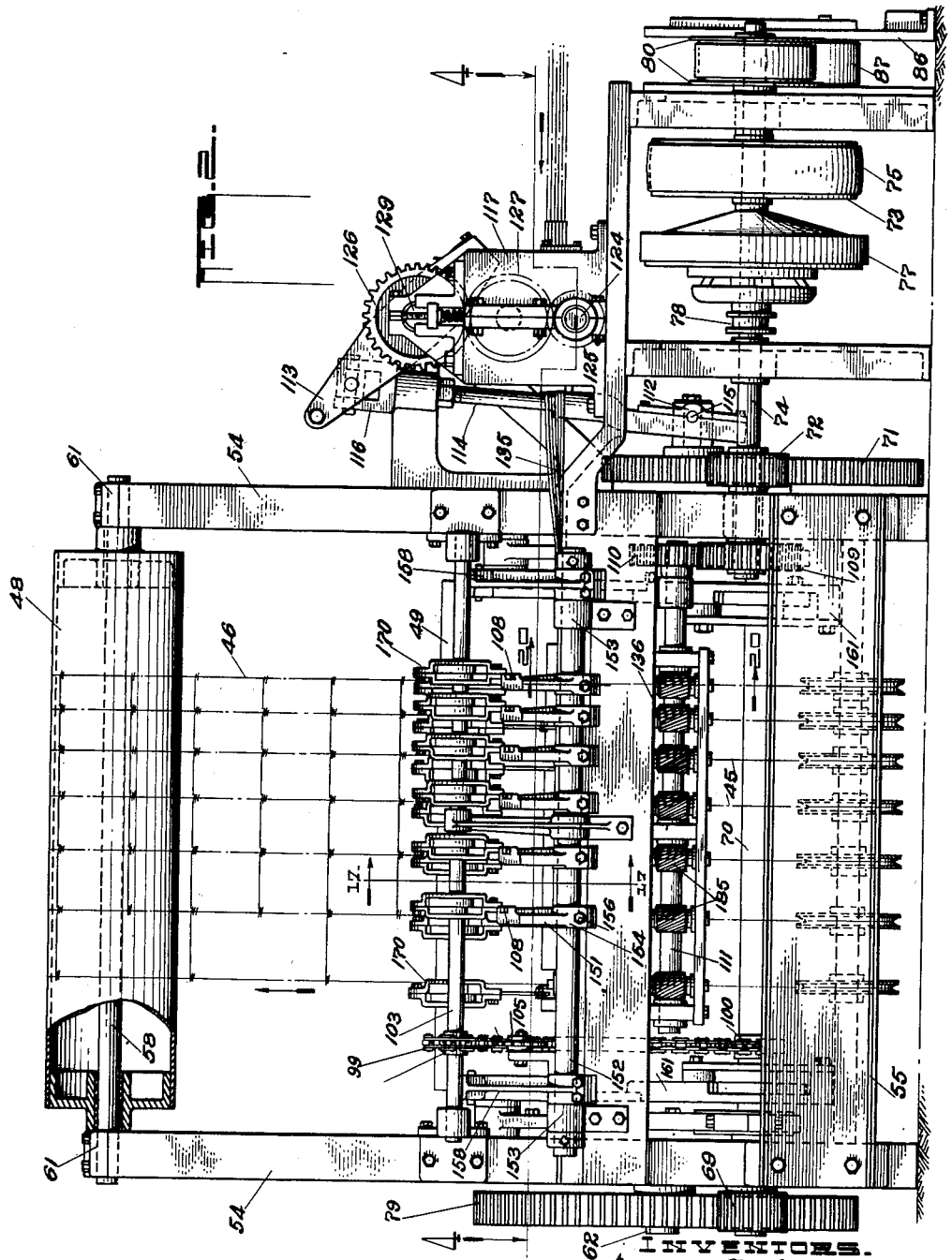

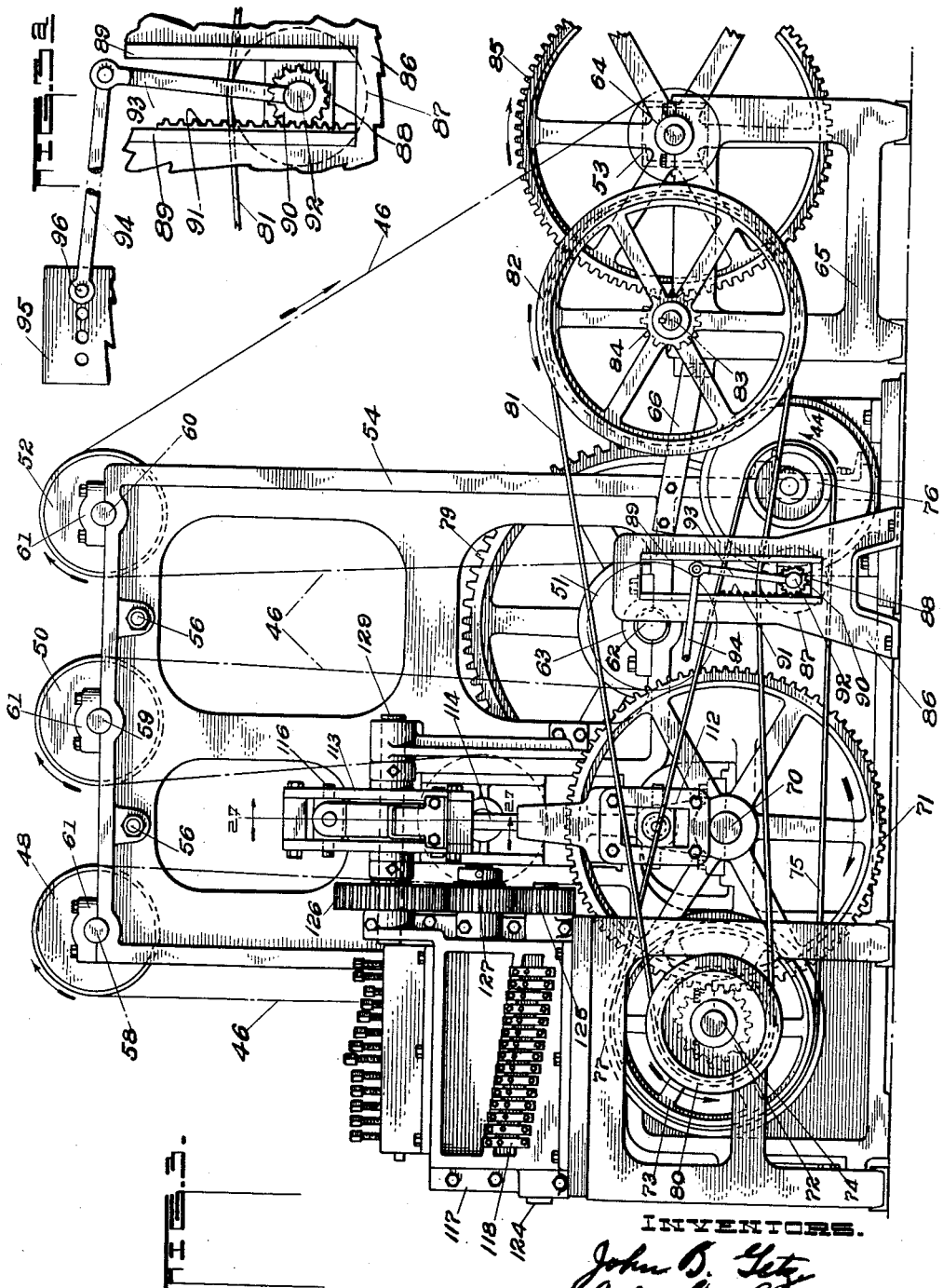

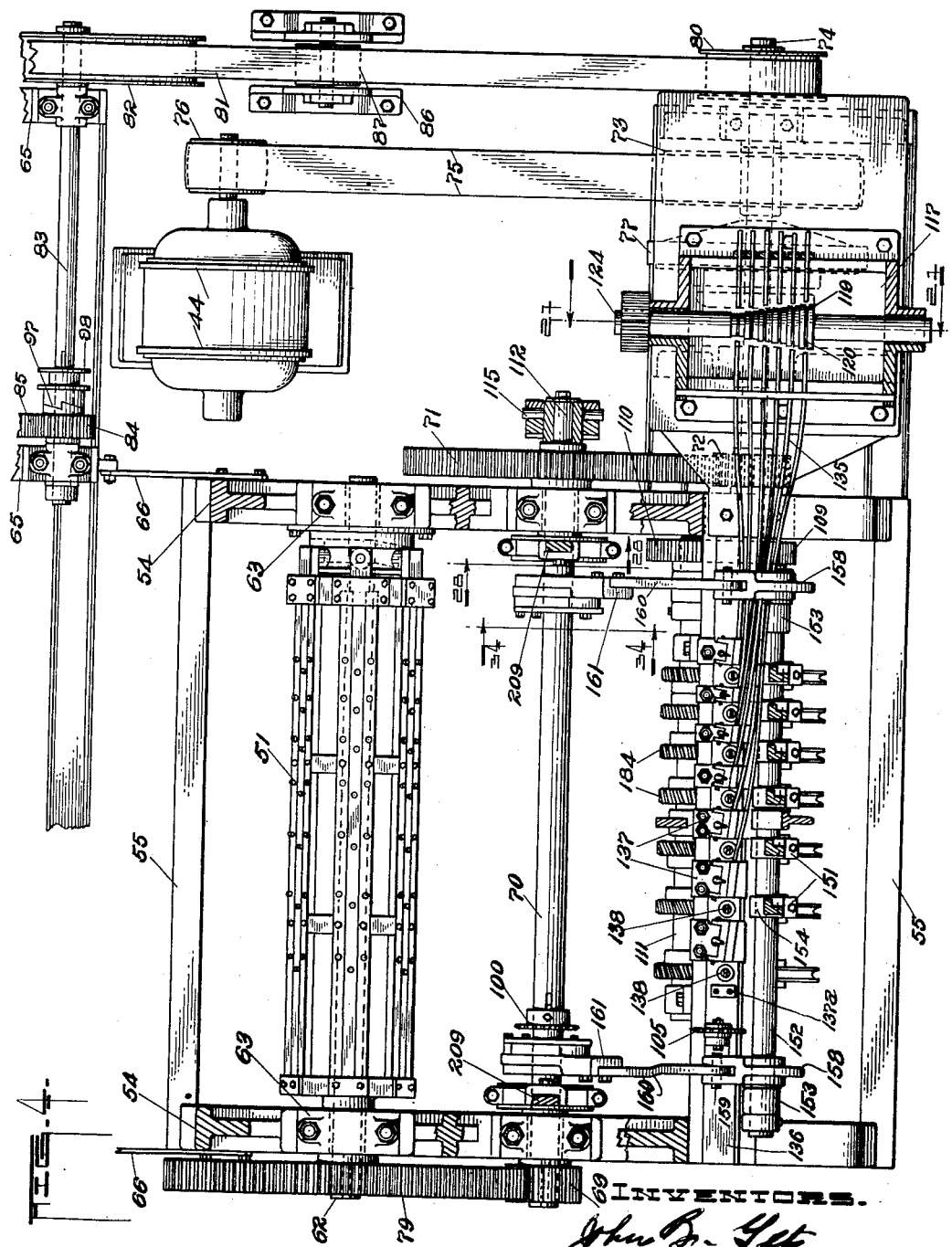

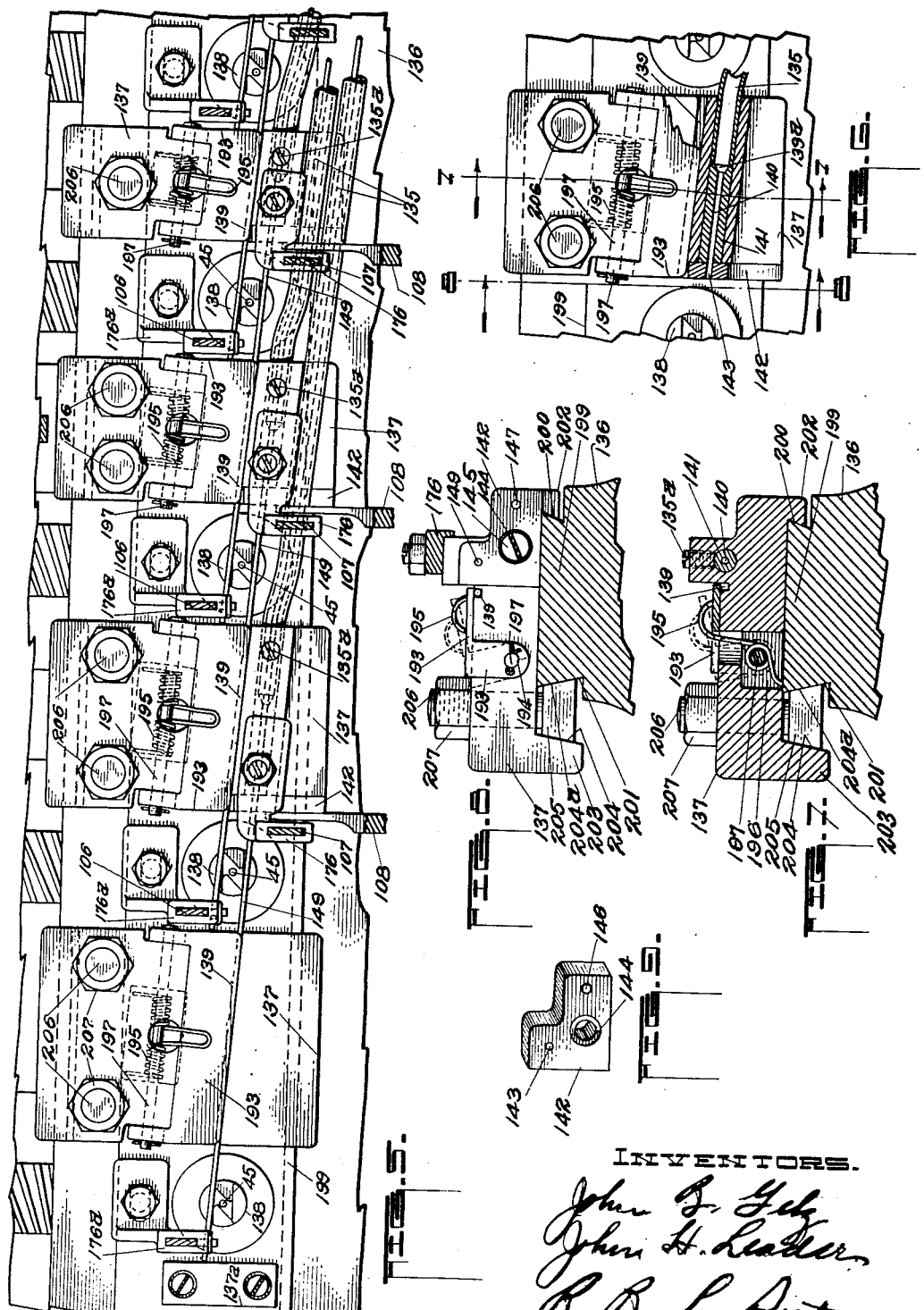

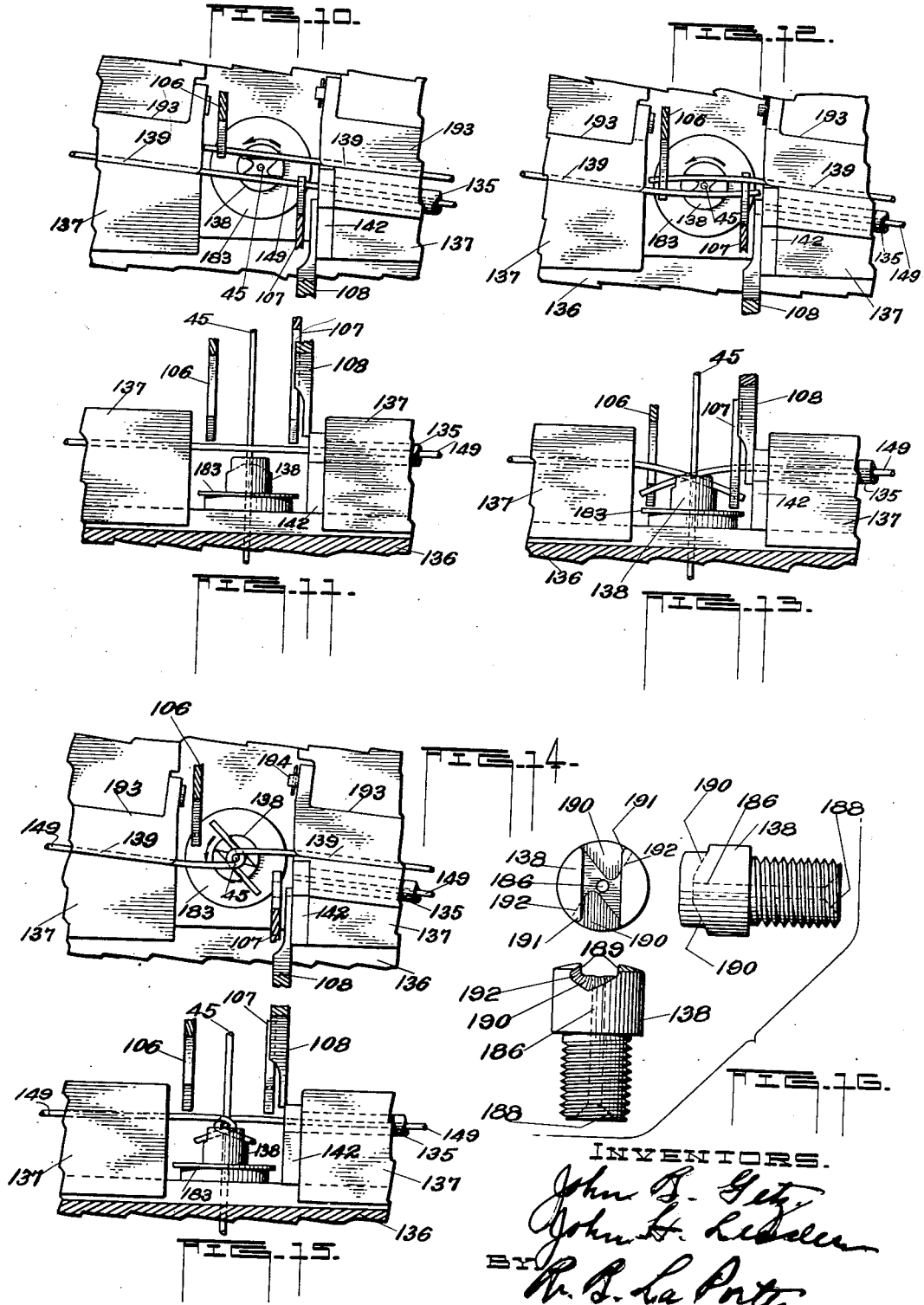

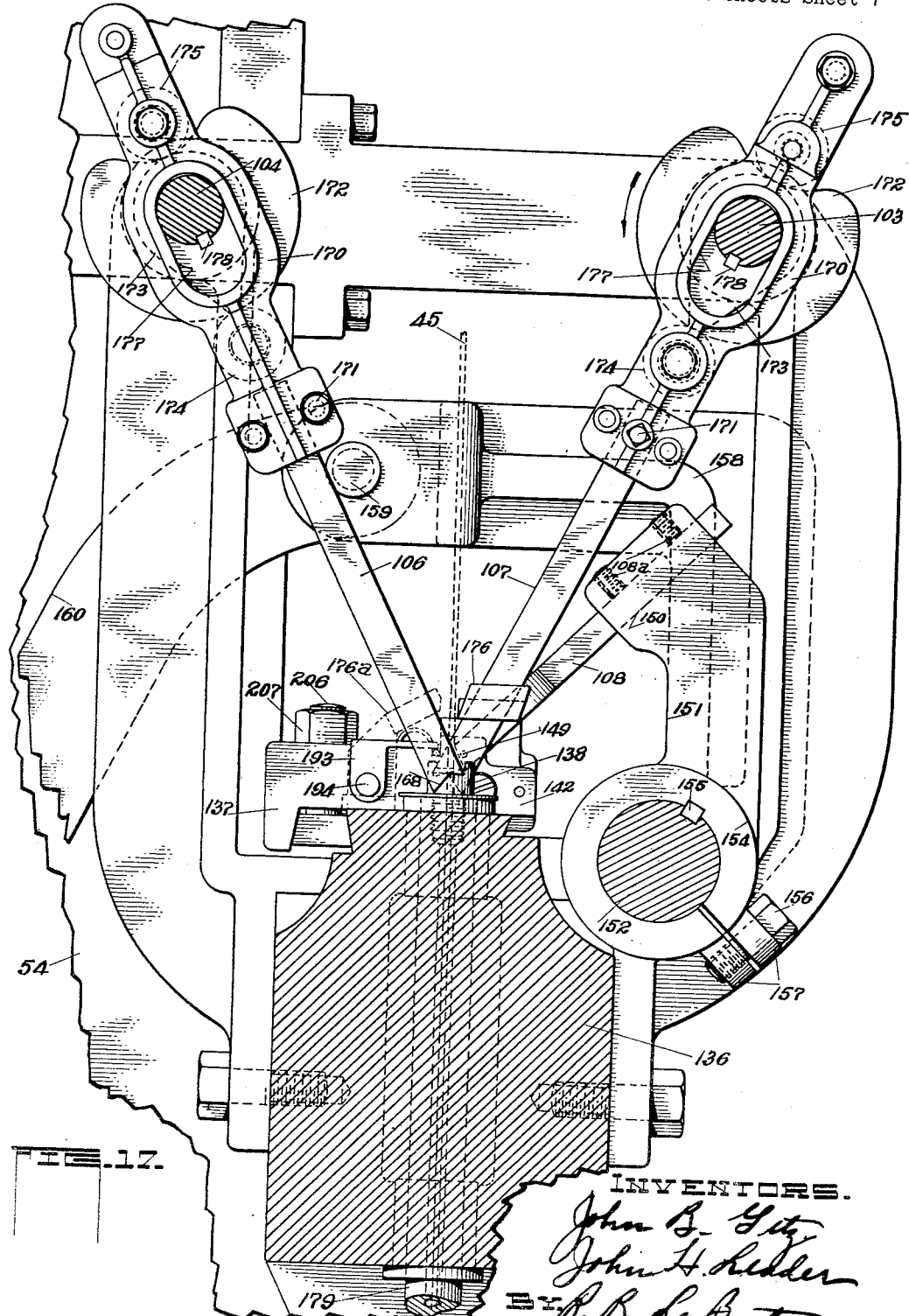

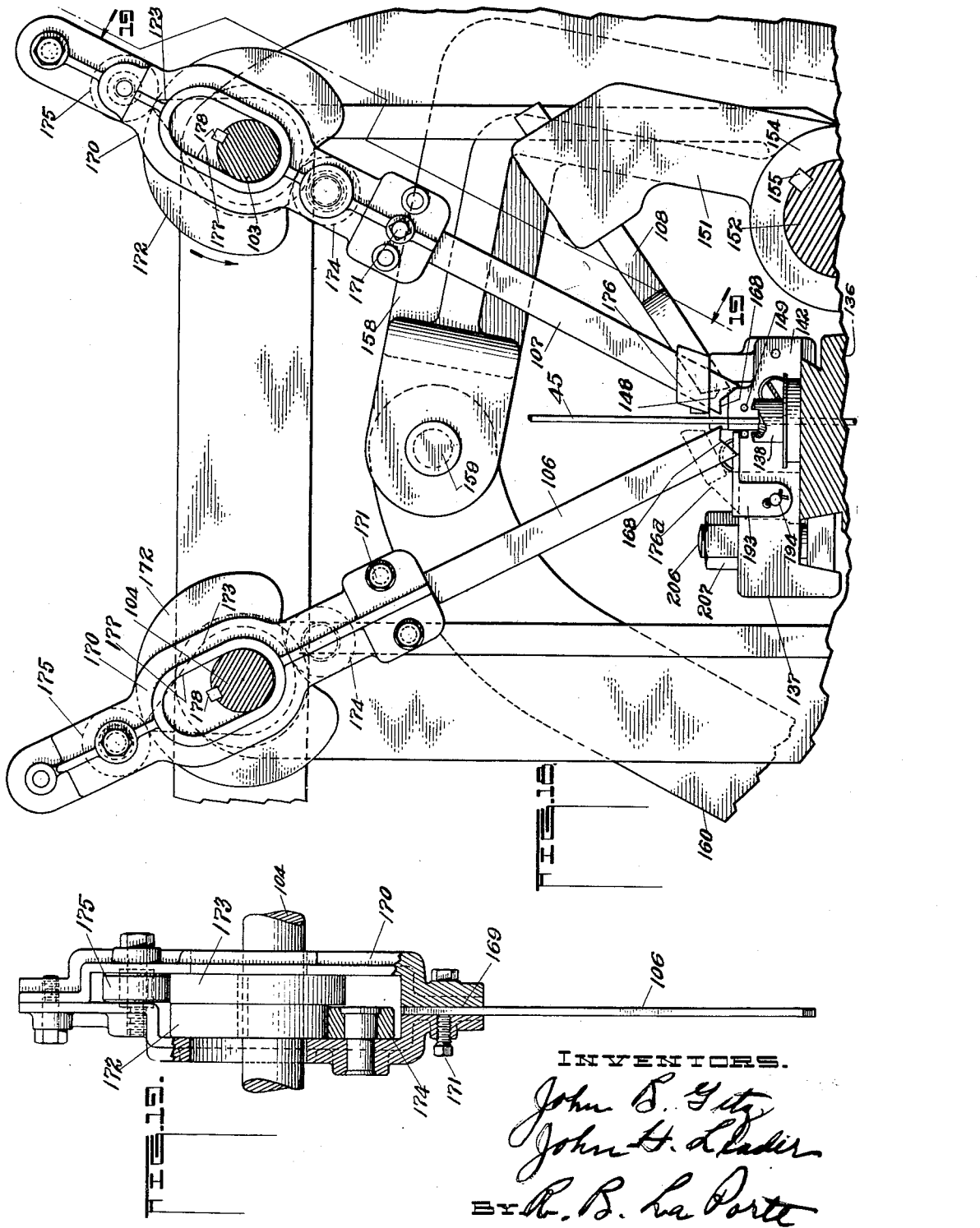

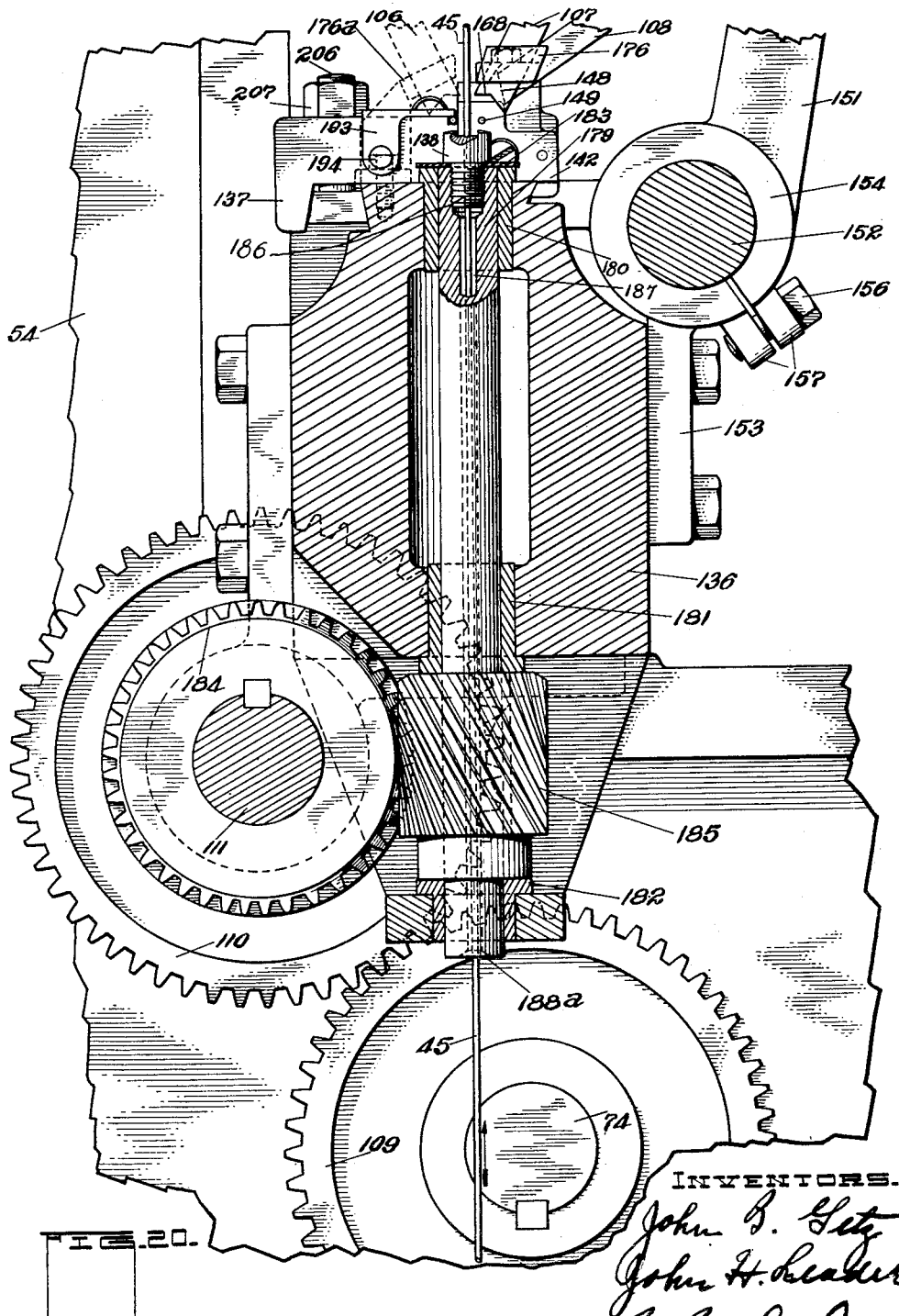

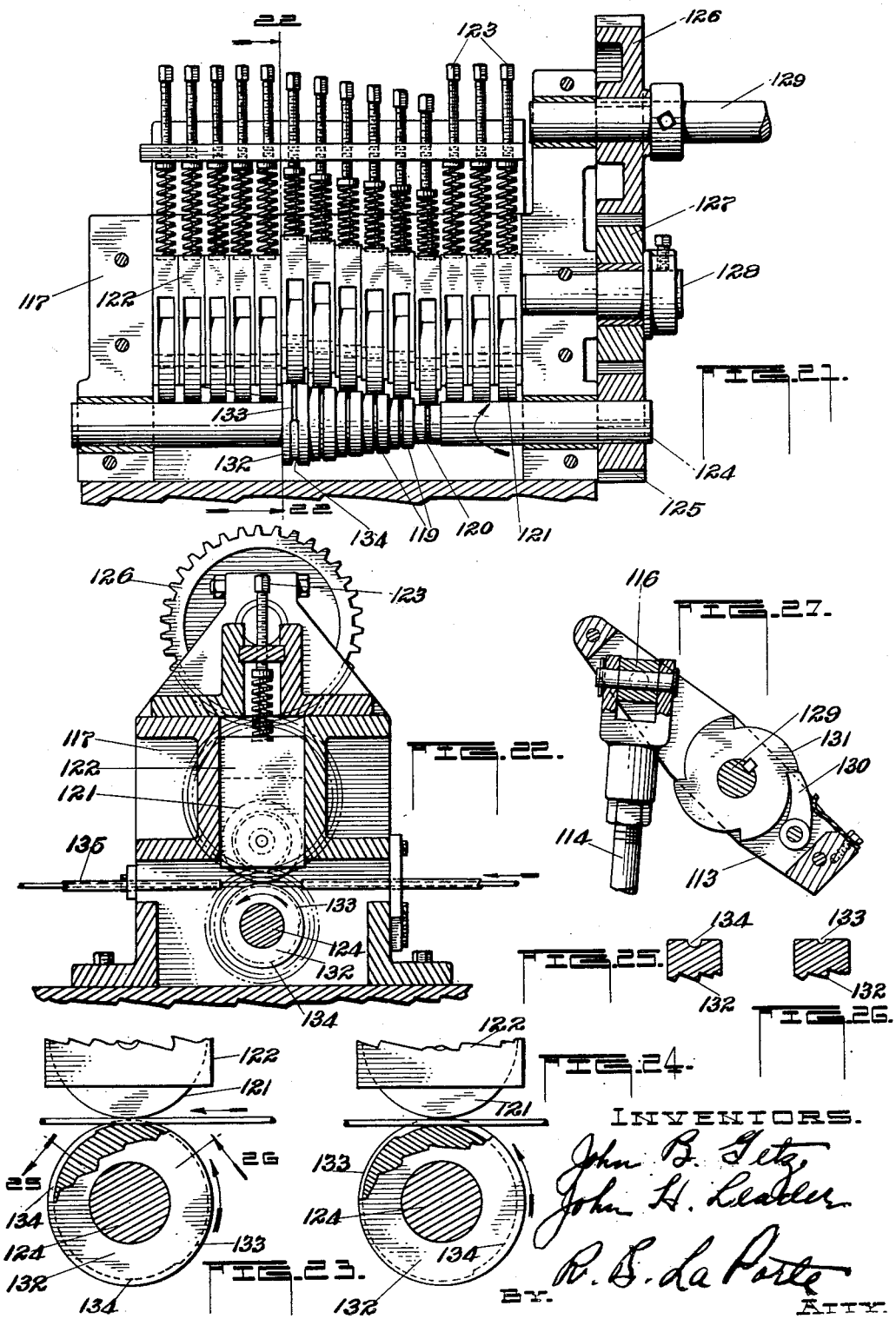

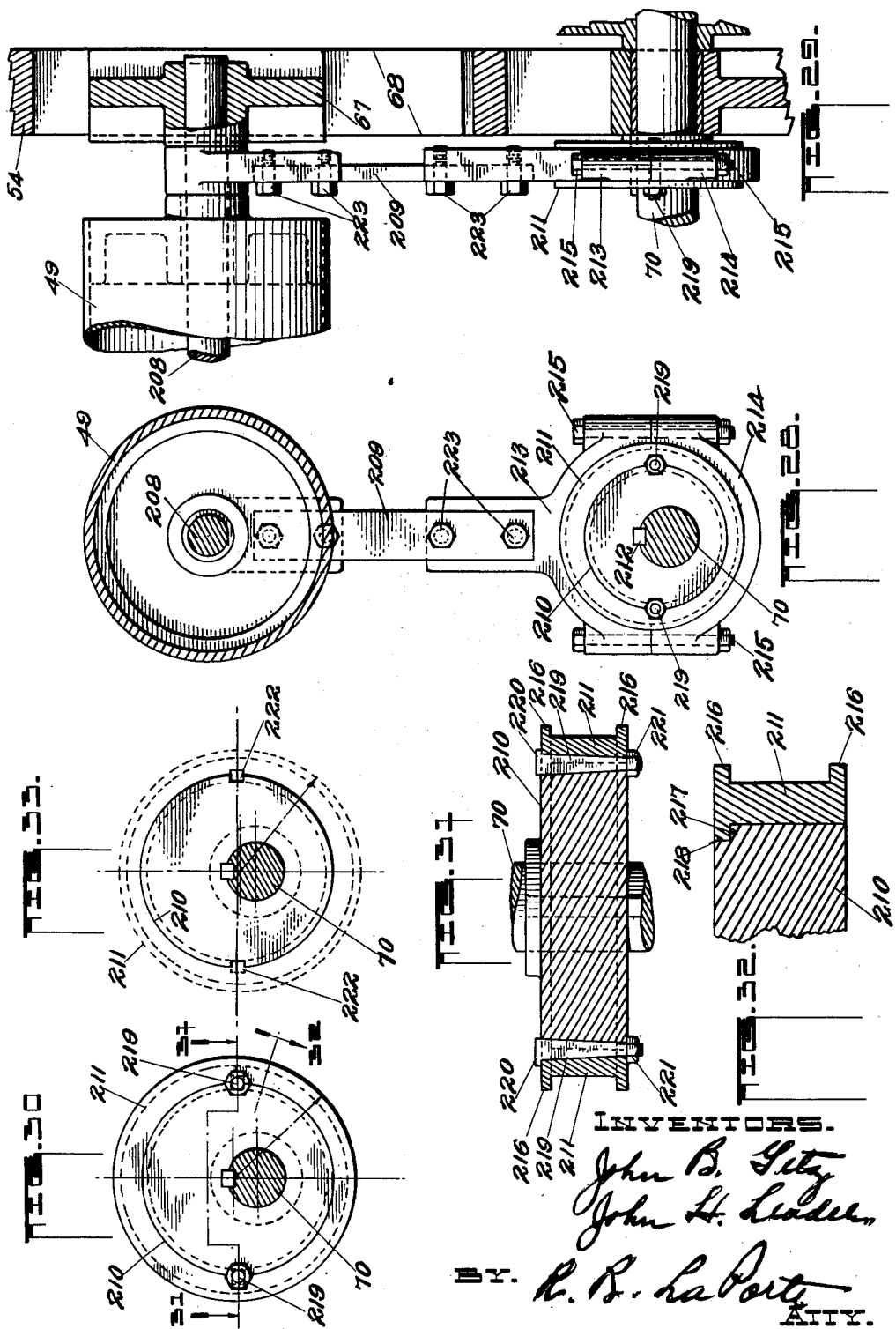

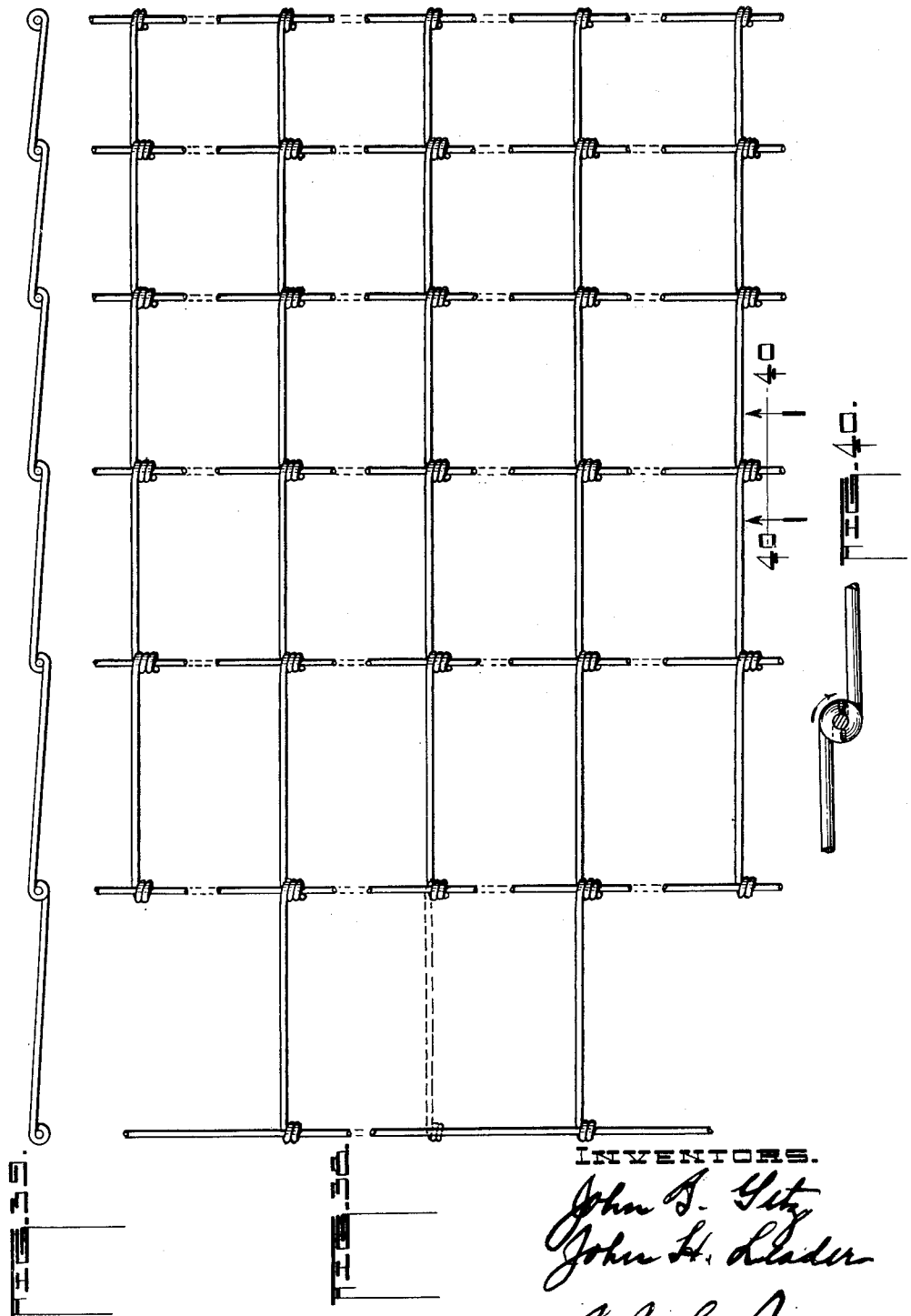

April 18, 1939.  J. B. GETZ ET AL  2,155,186
MACHINERY FOR MAKING WIRE FENCING
Filed Aug. 3, 1938  14 Sheets-Sheet 14
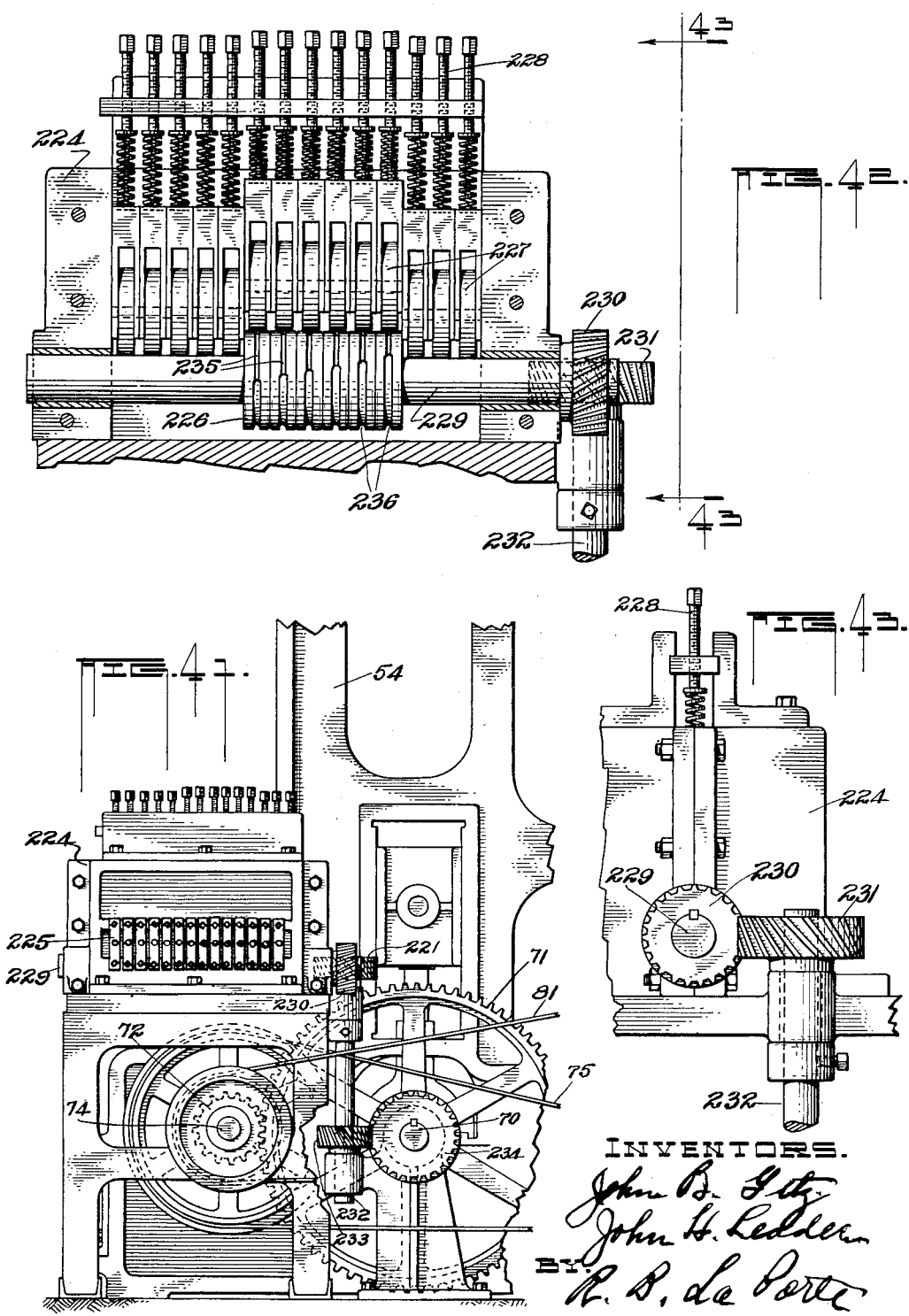

Patented Apr. 18, 1939

2,155,186

UNITED STATES PATENT OFFICE 2,155,186

MACHINERY FOR MAKING WIRE FENCING

John B. Getz and John H. Leader, Morton, Ill., assignors, by direct and mesne assignments, to said John B. Getz and Benjamin E. Getz, Morton, Ill.

Application August 3, 1938, Serial No. 222,849

66 Claims. (Cl. 140—13)

This invention relates to improvements in machines of the general type disclosed in Letters Patent No. 2,082,388, of June 1, 1937, for making wire fencing or similar products incorporating a multiplicity of line wires connected by transverse stay wires twisted or coiled thereabout and together to provide a strong fabric for expected purposes, and of flexible character to facilitate rolling on drums or reels in the process of manufacture and for storage or shipment in compact roll formation.

The machine of the aforesaid patent has, within the limits of its capabilities, proven in actual commercial practice to be practical and successful; but in this art of wire fence-making many considerations present more or less demand for cheapening the cost of manufactured output, maintenance of a nicety in uniform appearance of the product, the attaining of a variability of design as affects the spacing and number of the tie wires or stays, the elimination of waste, and danger in manufacture, etc.

With the foregoing in mind, and the primary object being to perfect the mechanism for fabricating a product of the character in question, the present invention embraces improved mechanism including adjustable instrumentalities whereby the relatively short tie or stay wires severed from a continuous feed wiring in being united will be uniformly positioned and coiled or twisted together and to complemental continuous line wires so that the resultant coils or twists will be of like number and extent throughout the fabricated product, thereby attaining correspondingly uniform strength and securing of the stay wires and line wires together without, on the one hand, offering relatively weak ties at given points and relatively strong ties at other points and, on the other hand, saving waste ensuing from excessive or non-uniform coiling or twisting.

Inherently, the final result accomplished by the improvement just stated will be the even, like appearance of the unions of the stay wires with the line wires throughout the fabric, as compared to similar fabrics wherein the feeds and twisting mechanisms are not provided with means whereby fixed relationships of parts may be adjusted and maintained and accommodation provided to meet expansions and contractions of the mechanical parts and/or of the stay wires tending to vary operating relationships from an original setting-up of the mechanism, even though great care be exercised in pre-arranging the parts for an initial operation of the machine.

Ancillary features of the improvements involve special formations of feeding rollers for guiding and facilitating the gripping and feeding, and freeing, at predetermined intervals, of the wiring from which the tie or stay wires are to be formed; whereby, (1) in an instance of intermittent drive of rollers of progressively increasing diameters, certain wires will be always gripped for advancement and a companion wire or wires freed to provide a lull in its advancing movement, and, (2) in another instance of continuous drive of rollers of uniform diameter, the variable feeding of the different wires will be attained by the proportioning of the gripping and freeing portions of the respective rollers, so that alternate feeds and lulls in advancing movement of the wires will correspondingly differ in the operation of the several rollers.

The invention more specifically includes a feed roller having relatively shallow and relatively deep portions extended circumferentially thereof, the relative lengths of the shallow and deep portions permitting equal periods of wire feed and lull during the rotation of the rollers, to coincide with a predetermined feed of companion rollers exerting a constant grip on wires to be advanced thereby and provided with operating mechanism causing a definite rotation thereof and definite extent of advance of the wire.

Another object is the provision of improved twisting mechanism for uniting the tie or stay wires to the line wires, whereby a firm hold will be had on the terminals of said stay wires while being twisted together, but a gradual release of said terminals from the twisters effected as the twisting or coiling of the terminals is completed, so that no hold or resistance on the tie will be offered by the twisters to the withdrawing or travel of the completed fabric away therefrom in the normal feed of the fabric through the machine.

Additional improvement resides in the provision of means whereby a continuous operation of the power line including the driving connections for the winding roll or drum receiving the completed fabric may be permitted while momentarily relieving the strong tension on the fabric being drawn from the machine after its completion and wound upon said roll or drum so as to eliminate dangers following from a severance of the fabric to enable the removal of a completed roll or drum of fabric, in which operation, under normal conditions, because of the great tension referred to, the severed ends of the fabric tend to fly about, distort themselves, and subject the operator to contact and injury from sharp ends.

Still additional improvement comprises provision, conveniently available to the operator, for regulating and more particularly increasing the tension of driving mechanism for the winding drum or reel, so that minimum power may be utilized in the initial windings of the reel, and added power attained as the reel increases in its convolutions and a more positive winding required to accommodate for the increasing diameter of the roll of fabricated material or completed fencing on the reel or drum.

The invention also embraces improved severing means for the tie or stay wires, operating independently of positioning means for locating and interfitting the ends of said tie or stay wires with the twisting mechanism, facilitating adjustment and more accurate operation than ascertained to be possible where the severing means and positioning members are accomplished by a common operating means; and, also, means for positively guiding, and therefore preventing any displacement from operative association of the positioning members in their to-and-fro movements relative to the twisting mechanism with which they are devoted.

More other features of detail of parts, and associations of parts, embodied in the improved mechanism will be evident or appear from the disclosures of the accompanying drawings forming a part hereof, in which the preferred form of the invention is illustrated, when considered in connection with the full description hereinafter presented, among which are special means for obtaining rectilineal movements of the positioning or depressor members for the tie or stay wires with reference to their twisting mechanism, in rectilineal paths and under the actuation of independent devices, one devoted to each positioning or depressor member as distinguished from operating them both by a common or single instrumentality; an improved eccentric and strap mechanism for varying the throw of certain of the operating parts of the machine; feeding means for the stay wires variably effective to furnish stay wires at predetermined points in the fabricated article while omitting said stay wires at other points; and more specifically, under the actuation of a continuous drive for the stay wire feed.

Now, referring to the aforesaid drawings,

Figure 1 is a side elevation of the left side of the machine, it being noted that the position of the operator is at the right of the machine as represented in this figure and that the travel of the line wires and fabricated material is generally in the direction of from right to left, as indicated by the arrows;

Figure 2 is a front elevation of the machine;

Figure 3 is an elevation, similar to that of Figure 1, of the opposite or right-hand side of the machine;

Figure 3ª is a detailed view of the belt-tensioning mechanism illustrated in Fig. 3;

Figure 4 is a view partly in section and partly in plan taken approximately on the line 4—4 of the machine as indicated in Figure 2, looking downwardly in the direction of the arrows;

Figure 5 is a fragmentary top view of a portion of the machine, illustrating primarily the form and relationship of the transverse tie or stay feed wiring and the guiding, severing, and twisting devices;

Figure 6 is a similar view of one of the guiding blocks and associated parts depicted in Figure 5, portions being broken away to expose the interior structure;

Figure 7 is a cross-sectional view on the line 7—7 of Figure 6, looking in the direction of the arrows;

Figure 8 is a similar view on the line 8—8 of Figure 6;

Figure 9 is a perspective view of a fixed shear plate depicted to cooperate with the correlated cutter, the same as is provided for each of the stay wire guiding and twisting devices;

Figures 10 and 11, 12 and 13, and 14 and 15 are companion pairs of plan and face views illustrative of successive positions of adjacent ends of stay wires, the stay wire cutter or shear, the twister adapted to engage the same, and the positioning means for cooperatively relating said ends with the said twister, parts being shown in section;

Figure 16 is a composite or projected series of views of one of the twister heads to portray the top and sides thereof, the latter being viewed at right angles to each other;

Figure 17 is a view in part elevation and part section on the line 17—17 of Figure 2, presenting a pair of stay wire positioning or depressor members, an immediately associated twister head, and cutter;

Figure 18 is a like view of an upper portion of the mechanism illustrated in Figure 17, showing the positioning members and cutter in their positions, extremely opposite to those occupied in Figure 17,—Figure 18 showing the positioning members and their actuating instrumentalities in retracted positions, whereas in Figure 17 these parts are in their fully stay cutting and positioning status, all with relation to the immediately associated twister head;

Figure 19 is a detail view partly in section and partly in elevation, taken approximately on the inclined or diagonally running line 19—19 of Figure 18, looking in the direction of the arrows, and showing one of the stay wire positioning members, the mounting or support therefor, and its actuating cam mechanism;

Figure 20 is a vertical sectional view of one of the twisting devices and certain parts of associated mechanisms, seen when looking towards the right of the machine as indicated by the arrows, line 20—20 of Figure 2;

Figure 21 is a detail sectional view, longitudinally of the machine, through the feed box for the wiring from which the transverse stays are formed, illustrating the means for obtaining predetermined feed and for resultant forming of fencing such as illustrated in Figure 2, that is, with tie or stay wires omitted from the fabric as between the upper pair of line wires, to give double spacing and a corresponding staggered effect;

Figure 22 is a vertical cross-sectional view of the feed box, taken on the line 22—22 of Figure 21, looking in the direction of the arrows;

Figure 23 is an enlarged detail view to show a special formation of one of the feed rollers for the wiring from which the transverse stay or tie wire is cut;

Figure 24 is a view similar to Figure 23, with said specially formed feed roll in another position with reference to the wiring, in this instance no feeding of the wiring being obtained, momentarily, whereas in the arrangement of the parts as shown in Figure 23 feeding is being accomplished;

Figures 25 and 26 are, respectively, fragmentary sectional views through the specially formed feed roll, at different portions of the latter, as indicated by the corresponding section lines 25—25, 26—26, as shown on Figure 23;

Figure 27 is a detail view of the actuating means for obtaining an intermittent rotative feed of the feed rolls for the wiring from which the transverse stays or tie wires are formed;

Figure 28 is a vertical sectional view through the timing shaft, of the pull-up drum and its shaft, with eccentric-and-strap mechanism for actuating the pull-up drum from the timing shaft;

Figure 29 is an edge view of said last mentioned actuating mechanism, the pull-up drum being fragmentarily illustrated in elevation, and the associated frame and guiding means being illustrated in section;

Figure 30 is a detached face view of the eccentric and the adapter cam ring surrounding the same adapted to be received in the strap, as illustrated in Figure 28;

Figure 31 is a horizontal sectional view of the eccentric and adapter cam ring, as indicated by line 31—31 of Figure 30, intended to particularly illustrate the locking wedges or keys between the eccentric and the adapter ring;

Figure 32 is an enlarged detail fragmentary cross-sectional view to illustrate the interfitting of the adapter ring with the eccentric at points intermediate the locking wedges or keys;

Figure 33 is a view similar to Figure 30, of the timing shaft and eccentric keyed thereto, with the adapter ring removed, but showing in dotted lines how the adapter ring may be keyed to the eccentric in position to give a varied throw as compared to the throw under the adjustment of the adapter ring, as illustrated in Figure 30;

Figure 34 is a detail side elevation of the actuating means for the cutters for shearing the tie or stay wires from wiring provided for that purpose, the position of the cams in this Figure 34 being that in which the cutters are in completely retracted position;

Figure 35 is a longitudinal sectional view taken on the line 35—35 of Figure 34, looking in the direction of the arrows;

Figure 36 is a view similar to Figure 34, the cam mechanism being shown in the position occupied as the shearing operation is completed;

Figure 37 is a similar view illustrating an intermediate position of the mechanism cam, being that position approximating the starting of movement of the cutters for the next severing operation, after allowing an adequate interval to permit the twisting of previously severed tie or stay wires to their appropriate line wires and for the withdrawal of the completed fabric from the immediate zone of operations;

Figure 38 is a face elevation of the fabricated fencing (that shown in full lines) produced by the mechanism illustrated in the preceeding figures and which fencing is shown in a more or less diagrammatic sense in Figure 2;

Figure 39 is an edge view of the fencing as illustrated in Figure 38;

Figure 40 is a sectional view through one of the line wires looking towards the intertwisted adjoining ends of the stay or tie wires, or in the direction of the arrows, line 40—40 of Figure 38;

Figure 41 is an elevation of a part of the right-hand side of the machine, as similarly illustrated in Figure 3, but incorporating a modified type of feed mechanism for the stay or tie wiring, in this instance the feed rollers having provision for a continuous rotative drive thereof as distinguished from the intermittent rotative drive of that embodiment of the invention illustrated in said Figure 3 and more in detail in Figures 21 to 27, both inclusive, whereby a full length stay type of fencing is produced as indicated in dotted lines in Fig. 38;

Figure 42 is a sectional view of the feed box of the modified form of the invention illustrated in Figure 41, similar to the sectional view of the feed box of Figure 3, as illustrated in Figure 21; and Figure 43 is a detail view of a part of the continuous drive mechanism for the feed rollers and the mechanism illustrated in Figure 42.

Referring more specifically to the drawings wherein like reference characters designate the same parts in all views relating to a given embodiment of the invention, and having in mind that all operations throughout the machine are from a primary source of power such as an electric motor 44 (Figs. 3 and 4), reference is first made to the general course in keeping with the wiring as manipulated to produce the fabricated product, and for this purpose, and viewing especially Figures 1 to 3, inclusive, it will be noted that the passage of the line wires and ultimate fabric (the line wires bridged by and connected to the tie or stay wires) through the machine from the forward to the rear end thereof is indicated by the dash-and-dot line 45—46 (Fig. 1), the travel being shown by the arrows, 45 indicating the line wires as fed through the machine and 46 the fabric comprising said wires connected transversely to the stay or tie wires. These line wires in any number desired and suitably spaced apart are fed into the machine at the forward base portion thereof, thence upwardly in a vertical direction through the zone generally indicated at 47 (Fig. 1) in which the wiring to form the ties or stays is supplied from a direction at right angles to the vertical travel of the line wires, and also where the tie or stay wires are cut of desired length and twisted together and to the line wires, all of which will be pointed out more definitely later on. From this tie or stay wire applying zone the fabricated product passes upwardly around a drum 48, thence downwardly around a pull-up drum 49 and again upwardly and around a second drum 50 from which it passes downwardly around a crimping roll 51, from which the fabric again takes an upward course around a third drum 52 from which a winding drum 53 draws and winds the fabric into roll formation, the fabric at this passage or rear end of the machine taking an outward and downward inclined course from the drum 52 to the winding drum, spool or reel 53.

The various drums referred to and the operating devices therefor are of course mounted upon a suitably supported and firmly braced framework desirably of metal comprising, in the main, a pair of strong rigid metal castings or side frames 54 constituting the opposite sides of the machine, spaced a suitable distance apart to accommodate the interior of the mechanical parts of the machine and united together not only by the various shaftings to be described but also by strong cross-beams of channel metal 55 and tie rods 56, the latter being at the top of the machine and the channel beams at the bottom, for convenient application, and the rods passing through the side frames 54 and the beams being seated and bolted in complemental recesses 57 formed in the end edges of the metal sides. The drums 48, 50, and 52 are alike in character, occupying the same horizontal plane, and are provided with shafts 58, 59, and 60 mounted on the top of the side frames 54 and suitable bearings 61, as shown, the upper portions of the bearings being removable by simply unbolting the same for withdrawal and replacement of the drums, as will be obvious. These drums 48, 50, and 52 are of a length to substantially span the space between the side frame members 54. This is also true of the length of the pull-up drum 49 and of the crimping roll 51, the shaft 62 of the latter being supported in suitable bearings 63 on the side frame members in substantially the same manner as the drums, as 48, 50, and 52 are removably supported in place.

For the sake of economy and ease of manufacture, the eventual winding drum or roll 53 is supported in similar bearings 64 on a separately formed metallic frame or stand 65 held in operative relationship to the main frame members 54 of the machine by rigid metal bars 66 bolted at their opposite ends to the stand 65 and to the main frame, respectively.

The pull-up drum 49 is supported by slidable bearing blocks 67 movable upwardly and downwardly in slideways 68 formed in the side frame members 54. The to-and-fro movement of the pull-up drum, for purposes well understood in the art, being accomplished by positive driving mechanism, will be pointed out in detail. The drive therefor is primarily through a small gear or pinion 69 mounted on or keyed to what may be appropriately designated the timing shaft 70 for all of the critical or working parts and timing of the machine.

Now, referring to Figure 4, it will be seen that this timing shaft 70 receives its rotation and correspondingly rotates the pinion 69 through the medium of a large gear 71 at the end of the shaft 70 projecting beyond the opposite side of the machine, the same meshing with a small gear or pinion 72 which derives its power from the motor 44 by means of a pulley 73 adapted to be clutched to the shaft 74 and provided with a belt 75 passing around a pulley 76 mounted directly on the shaft of the motor 44, 77 being the main clutch of the machine, adapted to be thrown into and out of connecting position through any suitable means engaging a shaft collar 78 (Fig. 2), the details of which clutch may be optional with the user and need not be specifically pointed out herein.

To rotate the crimper roll 51 a large gear 79 is attached to that end of the crimper roll shaft 62 in immediate engagement with the small gear 69 for the pull-up drum, so that the rotation of the small gear or pinion 69 will effect the desired rotation of the crimper roll.

It being remembered that the motor 44 through the pulley-and-belt arrangement is driving the pulley 73, power may be taken off the shaft 74 of the latter to effect the drive of the winding roll or drum 53 mounted on the shaft 64, this being accomplished by the gearing to the shaft 74 at the outer end thereof, another pulley 80 around which a belt 81 passes and communicates motion to a pulley 82 mounted on a shaft 83 supported in suitable bearings on the auxiliary frame or stand 65, so that through the medium of a small gear or pinion 84 on said pulley shaft 83, engaging with a large gear 85 fixed to the shaft 64 of the winding drum 53, the latter will be rotated.

At this point it may be well to state that the slippage between the belt 81 and pulley 82 and/or the pulley 80 will compensate for the increasing diameter of the ultimately rolled fabric roll while permitting the winding drum or reel to normally possess continuous rotation; but occasions arise when it is desirable to control and adjust the tension and render more or less positive the drive for the roll and drum. To this end, at one side of the machine, namely, adjacent the motor, there is provided another auxiliary supporting stand 86 in which a belt tightener capable of severe adjustment with reference to the belt 81 is mounted. This belt tightener is in the nature of a roller 87 arranged to impinge against the under surface of the lower run of the belt 81, said roller being mounted in bearing blocks 88 vertically movable in slideways 89 formed in the castings constituting the auxiliary stand or support 86. The means afforded for shifting the bearing blocks in said slideways and correspondingly shifting said roller consists of a pinion 90 engaging a rack 91 overhanging to some extent the slideways 89, the shaft 92 on which the roller 87 is sleeved but to which the gear 88 is fixed being provided with an adjustable manually operable lever 93 extended to be within convenient accessibility to the operator of the machine by means of a link 94 adapted to be adjustably held in any one of the apertures of a bracket 95 by a pin 96 on any convenient support, the details being sufficiently shown in Figure 3A.

In view of the fact that the completed fabric roll on the drum or reel 53, especially where severe tightness exists in the belt 81, will exert great tension on the downwardly and outwardly drawn fabric, traversing the inclined path from the drum 52 to said winding drum 53, and it being necessary to cut the fabric transversely thereacross to permit the removal of a filled reel or completed roll, some means must be provided to momentarily relieve the strain or tension on the portion of the fabric to be cut in order to prevent the same from flying about under its springy action resulting from the relief of tension, correspondingly distorting the fabric or in instances injuring the operator who is performing the severing operation, or other persons in proximity to the machine. This means is an auxiliary clutch, that is, a clutch supplemental to the main clutch 77 which is adapted to control the power of the entire machinery,—capable of releasing the winding reel or drum from the rotative force of the normal mechanism, while permitting the latter to continue in its operation. Such clutch is represented at 97 keyed to the shaft 83 driven by the wooden pulley 82 from the belt 81, the clutch 97 being adapted to be moved backwardly along the shaft 83 from operative clutching position with the small gear 84 which drives the large gear 85 of the winding reel or drum. Any suitable means adapted to engage the collar 98 of the clutch 97 will effect slowing down and stopping of the movement of the reel or drum so that the tension on the oncoming fabric is relieved and the difficulties just recited obviated during the shearing of the fabric. The cut end of the fabric being attached to a fresh reel or drum and the clutch 97 having been forced home, that is into clutch-engagement with the gear 84 to drive the same through the shaft 83, the winding of the fabric as delivered from the machine will continue as before.

Continuing, with reference to the driving mechanism for the machine, controlled as previously stated by the timing shaft 70, and again inspecting Figure 1, it will be seen that there is a sprocket chain 99 receiving power from a cooperating sprocket 100 on the shaft 70, which chain extends upwardly and towards the front of the machine to provide a horizontal run of the sprocket transmitting power to sprockets 101 and 102 on shafts 103 and 104 for certain operating cams to effect the operation of stay or tie wire positioning or depressor members, as will be later developed in this specification, an idler sprocket 105 being mounted beneath the lower run of the sprocket chain 99 to support and take up slack in the chain or tension the same, as may be desired.

The positioning members moved through the instrumentality of the sprocket chain and gears just described are to be seen at 106 and 107 in Figure 1 but are shown with clearness and in detail in Figures 17 to 19, inclusive, the cooperating cutter being shown at 108, the same and companion cutters being manipulated through connections also deriving power from the timing shaft 70.

The drive for the twisters that cooperate with the cutters and positioning members, thus far but generally referred to, is taken off the shaft 74 through a gear 109 engaging a companion gear 110 (Figs. 2 and 20) on a shaft 111 disposed transversely of the machine and having other suitable gear connection means with the twisters to impart movement thereto from said shaft 111.

In that form of the invention wherein there is an intermittent actuation of feed rolls for the wiring from which the tie or stay wires are to be formed, the power for obtaining the said intermittent actuation is, as disclosed in said Letters Patent No. 2,082,388 hereinabove referred to, derived from a crank 112, (Figs. 2 and 4), on the timing shaft 70, universally connected with a rocking beam, so to speak, 113 by a link connection 114, the latter having universal connections 115 and 116 at its opposite ends with said crank and rocking beam.

The power-supplying mechanism for the various steps or features of the machine utilized in the sequence of operations in forming the fencing having been understood, and the same being in general respects quite similar to that of the aforesaid patent, although improved in specific instances, as will be appreciated, the present improvements of individual mechanisms for forming, manipulating, and cooperatively associating elements of the fabricated fencing will be now discussed.

*The feeding means for the wiring from which the transverse stays or tie wires are cut.*—117 is a wire feed box at the front end of the machine, the same being provided on one side thereof with a multiplicity of apertured guide plates 118 in keeping with the number of wires to be passed transversely of the line wires 45 to furnish the desired number of stays. Aligned with these apertured guide plates and through which latter the wiring is introduced from any suitable source of supply, are any number of cooperating feed rollers to correspond with any predetermined operation of the machine as to number of tie or stay wires, comprising a series of rollers 119, each having a continuous peripheral groove 120 and complemental presser rolls 121 individually mounted in a reciprocal carrier 122 backed by adjustable bolt-and-spring pressure devices 123 to cause firm peripheral contact of one individual smooth peripheral roll 121 with and over the groove 120 of one of the series of rollers 119. The rollers 119 are removably mounted in any desired number on the shaft 124 while the individually reciprocal rolls 121 are closely related and fill the space within the feed box 117 so as to maintain them in cooperative relationship and their carriers 122 in slidable contact with each other. The shaft 124 is keyed with an actuating gear 125 driven by a gear 126 through the interpositioning and intermeshing of a third gear 127 loosely mounted on a stub shaft 128, from the shaft 129 which is the shaft that supports the rocking beam 113 and on which the latter is sleeved for rocking movement under the influence of the universal linkage 114 and crank 112 continuously operated from the timing shaft 70, as heretofore explained. The gear 126 is actuated under the influence of the rocking beam 113 because of the presence of a spring-pressed pawl 130 engageable with a ratchet 131 keyed to the shaft 129 on which the gear 126 is fast so that, through the gearing 127 and 125 the shaft 124 of the latter will be positively driven at intervals to correspondingly rotate the rollers 119. The wiring from which the cross ties or stays are to be formed having previously been introduced into the grooves 120 of the rollers 119 and between the same and the flat faces of the cooperating rollers 121, and the latter having strong peripheral frictional engagement with the rollers 119 and wires passing therebetween, the wires will be fed through and out of the feed box to the appropriate extent to position them in the proper relationship to the cutting, positioning and twisting mechanisms, in keeping with the requirements of the fabric to be produced by the machine. The degree of rotation of the grooved rollers 119 is of course dependent on the degree of rocking movement of the rocking beam 113, and the extent of feed of the wiring is determined by the size, that is diameter, of the grooved rollers 119.

It is desirable at times, for purpose of design or even to save wire where tie or stay wires may be eliminated, for example as shown in the staggered or wide spacing of the stays between the upper line wires illustrated at the left of the fabric (Figure 2 or Fig. 38), to prevent the feed of any certain wiring or wires from which the stays are to be formed while not interfering with the uniform actuation of the means for imparting movement to the rollers to allow for such an operation. The roller 132, constituting one of the series of feed rollers and in all other respects the same as the rollers 119, is modified to the extent that the grooved portion 133 corresponding to the groove 120 in the rollers 119 extends but part way around the periphery of the roll 132 and opens to a substantially enlarged gooved portion 134 extending around the remainder of the periphery of the roll 132, the size of the cross-sectional area of the space provided by this relatively enlarged grooved portion being such that the wire will not be impinged upon by the companion presser roll 121 thereabove and the grooved roller will simply slip on the wire so that there is no feed thereof during the phase of rotation of the said enlarged grooved portion beneath the same.

In the embodiment of the wire feed mechanism immediately under consideration, and wherein the endless grooved rollers 119 are provided with intermittent operation, the rollers 119 are, of course, always in pressing relationship to their companion rollers 121 so that the wires from which the stays are to be formed are constantly gripped. The extent of advancement of the stay wires is determined by the step-by-step rotation of the rollers 119, and the variance in the extents of advance of the wires is accomplished by the difference in the diameters of the rollers relative to each other. It is preferable that the advancement of the wire equivalent to the length of a stay shall be accomplished in a one-half revolution of the rollers. This means that the gripping engagement between the relatively shallow grooved portion 133 of the supplemental feed roller 132 shall also effect an equivalent feed of its wire or, in other words, that the advance of the wire under the action of said shallow portion of the groove shall be effective through one-half revolution thereof. Now, assuming the wire to occupy the relatively deep portion 134 of this particular roller and the same has rotated past the wire (the wire being free and thereby prevented from feeding), as the higher point of the base of the relatively shallow groove rotates around towards the wire and elevates the wire away from the base of the relatively deep portion of the groove and towards the companion friction roller and, in fact, also as said base of the shallow groove is departing from the gripping engagement with the wire, there is in both instances a tendency to feed wire. To allow for this tendency and insure the advancing of the wire for one-half the revolution of the roller 132 in correspondence with the half-revolution advancing feed of the rollers 119, the relatively shallow portion 133 of the roller 132 is slightly shorter in circumferential extent than the length of the relatively deeper portion 134 of the groove. This accomplishes the ultimate effect of having the wire engaged by the relatively shallow or gripping portion of the groove to advance the wire quite accurately during one-half revolution of the roller and to similarly free the wire from any gripping and advancing movement during the other half-revolution of the roller; that is, during the predetermined lull in the feeding of wire of this particular instance, as distinguished from the immediate or regular succession of feeds by the continuous uniformly grooved rollers 119.

The advantage to be gained by resort to these grooved feed rollers with grooved portions of varying sizes, for the purpose outline, is an importantly novel and meritorious factor in the operation of the present machine.

Leading from right to left the machine and receiving the wiring, for the tie or stay wires as they are projected out of the rear of the feed box 117, are a series of flexible metal tubes 135 for guiding the wiring transversely through the machine, and disposing the same in proper relationship to severing, positioning, and twisting devices cooperatively related to the line wires that the respective stays are intended to bridge and fasten together.

*The means for relatively disposing the wiring from which the stay or tie wires are cut and the severing means therefor.*—As heretofore, there extends transversely through the machine, a sturdy integral steel member suitably styled a bed or bolster 136 rigidly secured to the upright side plates or castings 54. It is this bed or bolster that supports the wire-locating devices, part of the cutting means, the twisters, and receives the forces imparted thereto under the actuation of guiding and positioning means for the stay or tie wires with reference to the twisters. It also helps to support and render more stable the movable cutter elements and the cams and devices associated with the positioning means for the wires constituting the stays or ties with reference to the twisters and the line wires that, as usual, pass through the twisters. Mounted on the bed 136 is a series of blocks 137 (Fig. 5) in which the ends of the flexible tubes 135 are held by screws 135ᵃ. The length of the blocks is determinative of the length of the wire needed to bridge the space between the adjacent line wires allowing for terminal portions to be twisted together and to said line wires, so that as also again seen in Figure 40, the spacing between the line wires may be regulated and provided in closer or wider spaced relationship, for example by providing the line wires closer together at the bottom portion of a fence or at any portion thereof to be rendered stronger than other portions. The different widths of the blocks 137 and corresponding different spacing of the line wires is clearly shown in Figure 5.

The twisters 138 are disposed in vertical position, one in each of the spaces between the adjacent pairs of blocks 137, and the ends of the stay wires are extended across these spaces in parallelism so that the line wires occupy a midposition therebetween, the wiring to be severed being conducted through one of the flexible tubes 135, through the block adjacent which the same is to be cut, into and through a seating groove 139 opening outwardly from the upper surface of the next adjacent block and thence to abutting contact with the end wall of the succeeding block (a separate abutment 137ᵃ being secured to the bolster 136 beyond the far or outermost twister of the series); the corresponding parallel stay wire being seated in and passed through a correspondingly open groove in the immediate block where the cutting of the first mentioned wire is taking place. This leaves two oppositely extending terminal portions of stay wires to be presented to the twisting device for wrapping or coiling together and to the line wire passing therebetween following the severing operation. The wire to be severed conducted through the flexible tube 135 has, as usual, been passed through the tapered end 139ᵃ and the bore 140 of a hard metal guide 141 snugly fitted in the block 137 and truly aligned with an opening in the steel cutting member or shear plate 142 provided with an aperture 143, the aperture 143 and bore 140 being of substantially the same diameter as the wire, and the edge of the cutting member 142 immediately surrounding its aperture 143 coacting with one of the cutters 108 to sever the stay wire flush with the surface of the cutting member 142. When this particular stay wire has been thus cut, the companion stay wire having its oppositely extending end also free, the two terminal portions of the parallel wires are properly located and ready for depression into twisting relationship with the twister 138. The cutting member 142 is L-shaped, as shown in Figure 9, to allow space thereabove for the flexible guides 135, and has an opening 143 for the wire in the vertical portion thereof above the securing bolt opening 144 through which the bolt 145 may be passed into threaded engagement with a block 137, an opening 146 being provided in the horizontal face of the L-shaped cutting member to one side of the bolt opening 144 for the reception of a dowel pin 147 integral with the face of the block to more firmly hold said cutting member from displacement, as by turning on the attaching bolt 145.

The primary cutting means 108 comprises a steel blade having a sharp beveled cutting edge 148 arranged to be thrust through the stay wire 149 to sever the same by shearing action (Figs. 17 and 18). The blades include relatively heavy hank portions which are received in openings or sockets 150 in the ends of strong metal arms 151, binding screws 108ᵃ being provided to hold the cutters in adjusted position on the arms. The arms in turn are sleeved upon a common actuated shaft 152 mounted in bearings 153 bolted to the bed 136, each arm being provided with a split collar 154 keyed at 155 to the shaft 152 so as to swing under oscillations of the shaft 152, the collars and keys being held in position by bolts 156 engaging ears 157 on the opposite portions of the split collar 154. This assembly permits adjustment of the cutters endwise of the shaft 152 and allows for their removal and replacement as occasion may necessitate, the longitudinal adjustment of the cutters in the arms 151 and the adjustment of the collars 154 endwise of the shaft 152 enabling a very fine and accurate positioning of the cutter edges in keeping with the adjustment of the blocks 137 and to insure the cutting operation immediately adjacent the end surface of the block between the cutting members 108 and 142. The cutters are thrown into and retracted from cutting position by the aforesaid oscillations of the rock shaft 152 by elbows 158 fastened on the shaft 152 at the lower ends of their vertical portions, and pivoted at the outer ends of their horizontal portions, as at 159, to a connecting rod 160 carrying a cam chamber or housing 161 at its lower end through which the timing shaft 70 passes and on which cams 162 and 163 are keyed at 164. The cam 162 is primarily of heart-shape whereas the cam 163 is approximately of pear-shape. The cam 162 rides upon and exerts movement to a roller 165 in the upper portion of the housing 161 and the cam 163 rides upon and exerts movement to a corresponding roller 166 mounted in the lower portion of said housing. The housing is slotted at 167 in its opposite faces, the slots extending in a direction longitudinally of the connecting rod 160 so that the latter under the influence of the cams in the rotative movement thereof with the timing shaft 70 will effect longitudinal movement of the connecting rod 160 on and transversely of the said timing shaft.

As such shaft rotates at the appropriate time in the sequence of operations of the machine, the cams 162 and 163 are so correlated that when the point of the cam 163 is in its extreme downward position, as indicated in Figure 36, the same has moved the connecting rod 160 downwardly to a sufficient extent to correspondingly depress the pivoted end 159 of the elbows 158, thereby rocking the shaft 152 and consequently the arms 151 keyed thereto inwardly to engage the cutter 108 with the stay wiring and sever the same; and when the cam 162 is rotated so that its point is upwardly disposed the cam 162 will have moved the parts in the opposite direction from that just stated, so that the connecting rod 160 moves upwardly elevating the pivoted end 159 of the elbow 158 and turning the shaft 152 to consequently throw the cutter carrying arms 151 outwardly and the cutters 108 away in a retracting movement from the work.

We have found that by having the cutters adjustable to the fine extent indicated and by providing cutter-actuating devices independently devoted thereto rather than depending on a common means for actuating the cutters and also actuating other instrumentalities having to do with the cutting and twisting operations, more successful results are attained and the more complicated actuating mechanisms avoided.

*The positioning mechanism for the stay wire terminals and actuating means therefor to locate said terminals in operative association with the twisting means devoted thereto.*—Heretofore it has been attempted to sever the stay wiring and to position the terminal portions of wire stays by a sequentially manipulated mechanism as a combined unit in the machine or, in other words, through the employment of a common actuator for both the cutter and the wire-positioning means; but in the present improvements the positioning members for the stay wires have their own independent actuators, as above stated, accurately facilitating adjustment and maintenance of adjusted parts in more satisfactory cooperative association. The same is true of the provision herein of relatively independent or separate mechanisms for actuating each positioning member, again as distinguished from the prior patented apparatus wherein the positioning members were a unitary part of a common carrier. The positioning members (previously designated 106 and 107, Figs. 17 and 18) are mounted and actuated independently of each other through their own supports and actuators. The positioning members comprise, in each instance, an elongated strong metal blade provided with a V-shaped lower end 168, the upwardly converging edges of which help in the engagement of the effective end of the blade with the stay wire terminal intended to be engaged thereby and the forcing and retention of the said wire in the deepest seating portion thereof inevitably retained and forced downwardly by the positioning member in keeping with the depressing movement of the latter under the force of its mechanism now to be described.

The upper end or shank of the positioning member (Figs. 17, 18, 19) is securely seated in a socket 169 in the lower end of a cam housing or mounting 170, all useful longitudinal adjustment of the positioning member being afforded by adjustment of said shank in said socket and passing of the same in desired adjusted position by a binding screw 171. The housing 170 encloses a pair of cams quite like those just above described in connection with the actuator for the cutters 108, in this instance the approximately heart-shaped cam being indicated at 172 and the approximately pear-shaped cam at 173. The cam coacting rollers are respectively shown at 174 and 175. Similarly to the operation of the cams employed for the cutting operation, the relation and operation of the cams in the present instance is such that when the enlarged portion of the heart-shaped cam is in the position indicated in Figure 18, with the point of the pear-shaped cam in correspondingly high position, said heart-shaped cam 172 will have raised a positioning member, as 106—107, out of or away from the twisting zone of operation and, on the other hand, when the cams are in their opposite positions, as indicated in Figure 17, the presser members 106 and 107 will have been forced downwardly into said operating zone to correspondingly engage the wire terminals with the twisting head 138 and create downwardly bent portions of the wire as shown, for example, in Figure 13.

To prevent any possible flexing or deviation of the positioning members as a result of their length and the great force applied thereto, the lower free ends of the same are passed through the metal guides 176 and 176ᵃ, the guides 176 being rigidly bolted to and adjustable on the blocks 137 and the guides 176ᵃ likewise rigidly bolted to and adjustable on the bed or bolster 136. These metal guides surround and closely embrace the positioning members to insure a constant and reliable cooperative relationship between the V-shaped lower ends of the positioning members, the stay wires, and twister at the twisting zone of operation. The presser members being independently operable and mounted in a way to move in separate true rectilineal paths renders it possible to provide their respective lower ends with the fixed guides by which to maintain the stated cooperative association of the related parts of the mechanism in accurate and more permanent stability notwithstanding the forces and strains, wear and tear encountered in a substantially constant running of a machine of this character.

The metal guides 176 and 176ª have their base portions formed of angular cross-section to fit corresponding edges of the block 137 and bolster 136, respectively, so as to prevent any tendency of the guides to shift around their fastening bolts (see Figure 8).

Of course, the cam casing or housing 170 is provided with elongated slotted portions 177 permitting the thrusting and retracting movements of the positioning members 106 and 107 under the action of the cams, over the shafts 103 and 104 to which the cams are keyed in desired position endwise of said shafts, as at 178, these shafts receiving their rotative movement through the medium of the sprocket wheels 101 and 102 (Fig. 1) thereon which receive their power from the chain 99 driven from the sprocket 100 on the timing shaft 70 (Fig. 4), all as outlined in connection with the description of the power-transmitting devices in the forepart of this description.

The mission of the positioning members 106 and 107 having been pointed out and it being assumed that they have duly functioned and the stay wire terminals have been seated in the twister head, we will now refer to the specific characteristics of

*The twisters and their operation.*—The twisters are, as previously observed, located one between each pair of blocks 137 throughout the range of the machine except at the front end of the gang of twisters and the far or outer end of said gang wherein in the former instance, a twister is arranged in advance of the initial block 137 and in the latter instance beyond the last block of the gang, because the initial twister is simply used to twist the initial stay alone to the first line wire and the final twister to twist the final stay alone to the last or top line wire, as distinguished from the operation of the intermediate twisters for twisting two stays together and to the line wires that are disposed between the initial or bottom line wire and final or top line wire, viewing the fabricated product, as a fencing.

Each twister comprises a hollow shaft 179 mounted in bearings 180, 181, and 182, supported by the bed or bolster 136 of the machine,—see particularly Figure 20,—the shaft having secured to the upper end thereof the twister head 138 shown in the composite or projected views (Fig. 16). An enlarged washer 183 is interposed between the twister head and its hollow shaft to help maintain the twister head in proper place when screwed home, the same being serviceable also in other respects, as fully disclosed in the aforesaid patent and needless to elaborate upon herein, it being sufficient to say that the parts of the twister assembly are detachably supported by the bed or bolster 136, as specified in said patent referred to. The driving means for the twister has already been pointed out in connection with the power mechanisms of the machine as including the driving shaft 74, the gear 109 keyed thereto, the transmission gear 110 meshing with the gear 109, and the driven connections between the twisters and this driving means, comprising the spiral gear 184 keyed to the shaft 111 and meshing with the spiral gear 185 keyed to the hollow shaft 179; this same mechanism being employed in connection with each of the twisters.

The twister head is of specially advantageous configuration, being provided at its center with the line wire bore 186 in alignment with the bore 187 of the hollow shaft or spindle 179 through which the line wire 45 passes. The lower end of the bore of the head is tapered and broadened out, as at 188, and the admission end of the hollow shaft or spindle is similarly formed (188ª) to initially facilitate the entrance and passage of the line wire. The head has a transverse straight parallel walled groove 189 therein, the base of which at both ends is beveled downwardly and outwardly as at 190 to permit depression of the end portions of the stays after they have been forced into the groove 189 at the opposite sides of the line wire and bore 186 therefor. The end inclinations 190 are in opposite directions to cause the ends of the stay wires to ride downwardly beneath overhanging ledges 191 at diagonally opposite corners and the grooved portion 189 to afford interlocks between the ledges and the end portions of the stay wires during the twisting operation.

The walls of the head immediately underlying the ledges 191, just referred to, are inclined as at 192 approximately tangentially of the circular bore 186 through which the line wire passes, the purpose of these inclined walls 192 being to cause the stay wire ends, that are being twisted together and to the line wire, to ride inwardly generally towards the center of the head so that when the twisting is completed the terminals of the wires will escape from the overhanging ledges 191 into the unobstructing groove 189. The twisted portion of the fabric will then be perfectly free to feed or rise upwardly away from the twisting zone of operation, this upward feeding of the travel of the fabricated material being permitted by providing the grooves 139 in the blocks 137 with spring-held covers 193 pivoted at 194 to the blocks and overlying the stay wires in the groove 139. 195 is the spring for normally maintaining these covers closed while the severing and twisting operations are going on. They will open under the pressure of the outgoing completed fabric. This operation will be recognized as one followed to some extent in previous practices, the present improvement residing in the forming of the groove 139 in the face of the block, the pivoting of the cover to the sides thereof, and the arrangement of the long strong spring, as shown in Figures 6, 7 and 8.

A suitable recess 196 is provided in the block 137 for the reception of the spring 195, the recess opening upwardly, and the outwardly projecting end of the spring being arched and bearing on the cover 193, the opposite or lower end of the spring bearing upon the top of the bed or bolster 136, a pin 197 passing through the opposite walls of the recess and the spring being coiled therearound; depending ears 198 depending from the cover 193 and pivoted on said pin 197, the part of the cover member between the ears being cut away to permit the swinging of the cover without interference with the top of the block 137, as indicated in the dotted lines, Figures 7 and 8.

The various positions of the ends of the stay wires during the severing, positioning and twisting operations is depicted in Figures 10 and 11 to 15 of the drawings, Figure 10 showing the projection of the wires in parallel relationship at the opposite sides of the line wire 45 and above the twister head 138, that is before severing and depressing of the stay wires into twisting or interfitting engagement with the twister head; Figures 12 and 13 showing the severed stay wires upon depression thereof into said interfitting engagement with the twister head,—Figure 12 showing a slight deflection of the wires in a horizontal plane towards each other to enable the same to enter the slotted portion 189 of the twister head so as to spring beneath the ledges 191, and Figure 13 showing the downward deflection of the wires to bring the terminals well below the groove 189 of the head, as permitted by the beveled portions 190 of the head at the opposite ends of said groove, while Figures 14 and 15 show the position of the parts as the twister head is performing its function in coiling the ends of the stay wires together and around the line wire. The various positions of the positioning members 106 and 107 will be clear from an inspection of the several views under discussion and the same is true of the various positions of the cutter 108, Figures 10–11 indicating the position of the latter as it is proceeding to its cutting position, Figures 12–13 immediately following the cutting operation, and Figures 14–15 the subsequent withdrawal of the cutter towards retracted position.

*The mounting and adjustment of the blocks 137 on the bed or bolster 136.*—In the earlier patented construction the blocks through which the stay wiring passed and was held during the cutting and twisting operation were formed of several parts and these parts were in turn secured in cooperative relationship and bolted in permanent positions to the bolster or bed of the machine. It has been found that because of the several-part formation and the fastening of the blocks in so-called permanent position it was, at best, difficult to fixedly maintain such relationship under the vibrations, natural wear and tear of the parts, etc. Furthermore, it becomes quite desirable at times to change or correct the correlation between the cutting and twisting means and the feeding and guiding or supporting means for the stay wires so that a minimum extent of terminals of the stay wires may be exposed to the twisting operation, or a greater extent thereof so exposed, whereby to correspondingly regulate the extent of coiling or winding the terminals about the line wires, presenting uniformity of appearance in the ultimate product, which can be enhanced by having the same number of coils and the same extent of coiling of the terminals of all the stay wires.

For all of these purposes and to enable an accurate correlating of the parts in question, we have found that by forming the blocks of an integral solid piece of metal, and by adjustably mounting the same on the bed or bolster, greatly improved results are obtained. By utilizing the adjustability of the blocks the different conditions attending different operations may be met, and of course at the outset the desired normal condition may be more readily established. The way of accomplishing this will appear from a number of the figures of the drawings but, again referring particularly to Figures 7 and 8, it will be seen that the top of the bed or bolster 136 is formed with a track or rail 199 dovetail in cross-section to furnish undercut opposite edges 200 and 201; also that the block 137 has along its edge adjoining the undercut edge 200 a flange 202, the inner edge of which is undercut to correspond with the edge 200 to hold the block against upward movement while permitting the same to slide longitudinally of the rail or track 199.

The opposite edge of the block 137 has a somewhat deeper depending flange 203 with an inner upwardly and inwardly inclining wall 204 forming with the downwardly and inwardly inclining surface 204ª at the edge of the rail 199, an upwardly converging or contracting groove. In this groove the correspondingly tapered head 205 of heavy bolts 206 is fitted for strong wedging and binding engagement with the inclined walls 204 and 204ª, respectively, on the rail 199 and block 137 to lock the same together, there being a pair of these locking devices for each block 137, and the tapered heads 205 being of any desired length permitted by the said contracting walls 204 and 204ª. The ends of the bolts are threaded and extend upwardly somewhat beyond the upper surface of the block 137 and have binding nuts 207 applied thereto adapted to impinge against said upper surface of the block to draw the wedge-shaped heads 205 of the bolts upwardly, thereby forcing the flanged edge 203 of the block to the left as seen in these Figures 7 and 8 of the drawings and creating corresponding binding action between the flange 202 and the cooperating edge 200 of the bed or bolster.

By the use of the foregoing arrangement the blocks may be adjusted transversely of the machine and with reference to the twisting and cutting mechanisms to obtain a truly accurate positioning of these parts in the first instance and to maintain such positioning as conditions may require in the running or resetting of the machine.

*The pull-up drum and its improved operating means.*—The fabric having been completed by the application and twisting of the stay wires together with the line wires, the same is fed through the machine in the course or direction designated by the arrows, Figure 1, the various rotating means and guiding rollers and drums having been previously described and appropriately designated.

It is customary, at a convenient point in the run of the fabric, to provide a pull-up mechanism around which the completed fabric is looped and through the medium of which the forward end of the fabric undergoing formation may have a lull in its movement sufficiently long for the twisting mechanism to perform its function, followed by a pull-up to advance the immediately completed fabric portion so that the succeeding application of stay wires, etc., may take place and the previously completed fabric advanced through the machine to compensate for said lull and permit of the on-coming or rear end of the completed fabric being continuously discharged and wound upon the reel or roll for removal from the machine.

As shown in Figure 1, the pull-up drum 49 is located at a position substantially below and in a vertical plane between the guiding drums 48 and 50. In this view, the pull-up drum is in its elevated position, or the position it occupies when the lull in the area of the twisting mechanism is being provided contemporaneously with the shortening of the run of fabric passing around the drum 50 to permit the passage of the fabric around the drum and on rearwardly therefrom without interruption or stoppage. On completion of the timing operation and to secure the advance of the immediately completed portion of the fabric, as above outlined, the drum 49, in accurate timing, as controlled by the timing shaft 70, is forcefully drawn downwardly to pull downwardly the fabric passing over the drum 48 and, correspondingly, upwardly the fabric leading to the drum 48 from the twisting zone.

In the aforesaid movements of the pull-up drum the same is guided by the slideways 68 formed in the side frames or castings 54 for the cooperating bearing blocks 67 in which the axle 208 of the pull-up drum 49 is reciprocally mounted. From the opposite ends of the axle 208 and sleeved thereupon between the ends of the drum 49 and the bearing blocks 67 is a pair of pitmans 209 extending downwardly to near the timing shaft 70 where they are connected to the timing shaft through an eccentric or cam device, the members 210 and 211 of which are concentrically mounted in nested relation to each other, the inner eccentric being keyed to the timing shaft 70 at 212 and the outer eccentric being received in the two-part eccentric strap 213, 214, the two halves of which are secured together by bolts 215. The eccentric 211 has outwardly disposed peripheral flanges 216 to ride upon the opposite faces of the strap members 213, 214, said flanges preventing displacement of the eccentric 211 with reference to said strap members. The cam 210 is formed with a circumferential shoulder 217 at one edge thereof for the accommodation of the flange 218 so that the one cam may be slipped into or over the other, as the same may be, and interfitted as illustrated in Figure 32, the two cams being then locked together against separation as well as against any independent movement in a rotary direction by wedging keys or bolts 219 having heads 220 at one end and nuts 221 engaging threaded opposite ends, the size of these keys being tapered away from their heads to converge towards their threaded ends and the meeting faces of the two cams 210 and 211 having registering grooved portions 222 with the base walls of the grooves tapered and converging similarly to the taper of the wedges or keys. By driving the keys or wedges home and applying the nuts 221 thereto, the keys are held against removal when interlocking and wedging the cams 210 and 211 together as an operating entity. The cam 210 may be appropriately termed the primary cam and the cam 211 a supplemental adapter cam ring.

Two (reverse) positions of the ring relative to the companion cam 210, and correspondingly with reference to the strap members 213 and 214 and the timing shaft 70, are illustrated in Figures 30 and 33 of the drawings, it being clear that under the relationing and securing of the cam members together, as in Figure 30, which is the same as is also shown in Figure 28, the upward and downward movements of the connecting rod 209 and correspondingly the pull-up drum 49 will be the maximum extent of their permissible movements; whereas under the arrangement illustrated in Figure 33 said movements will be lessened.

A self-contained cam mechanism of the character just described has been found to be a substantial improvement over the side-by-side cam arrangements previously employed for attaining the desired shifting movement of the pull-up drum, for many reasons, among which may be noted the relative small space within which the same must be confined to permit pivoting of the ends of the connecting rods or pitmans to the drum, while allowing opportunity for removal or replacement of the same through the use of detachable bolt connections 223.

Adjustment of the cams is especially desirable where it is intended that the fencing between the stay wires be closer together or wider apart, as in obtaining, for examples, a 6" or 12" spacing of the stay wires, as controlled by the adjusted positions of the cams in relation to each other and to the strap portion of the connecting rod that encompasses the ring or adapter cam 211.

It remains to be stated that, again in keeping with common practices, the completed fabric that passes on from the pull-up drum 49 is subjected to the action of a crimping roll 51, the construction and operation of which is well known in the art. The crimping roll in the present machine, as before stated, is indicated at 51, Figures 1 and 4 (the details constituting no part of the present invention). It is located to receive the downward run of the fabric from the intermediate overhead drum 50. From the crimping roll the fabric again pursues an upward course around the final drum 52, thence passes outwardly and downwardly to the winding roll or reel 53, following which, the fabric, when in a full roll formation and after severance from the remaining fabric in the machine, is removed for storage, shipping, etc.

Referring now to that embodiment of the feeding mechanism for the wiring from which the tie or stay wires are formed, as illustrated in Figures 41 to 43, inclusive, contrasted with that embodiment of Figure 21, the essential difference between the two embodiments is that whereas the mechanism of Figure 21 provides an intermittent drive for the wire feed devices, the mechanism of the instant embodiment (Figures 41 to 43, inclusive) affords a continuous drive for the said stay wire-feeding mechanism. The general arrangement of the parts of the two embodiments is alike in the sense that a feed box 224 is provided, on the face of which is a series of apertured guide plates 225 for the wiring, and within which box there is the desired series of driven feed rolls 226, with cooperatively related presser rolls 227, backed by adjustable spring-pressure devices 228, the spring-pressed rolls 227 being in a continuous series throughout the feed box 224 to enable the use of and their cooperation with varying numbers of feed rolls 226, as provided on the drive shaft 229 thereof, in keeping with the intended capacity and operation of the machine, the same as before. On the drive shaft 229 to which the rollers 226 are keyed, a spiral gear 230 is fastened, the same engaging a complemental spiral gear 231 at the upper end of the shaft 232, deriving its motion from corresponding intermeshing spiral gears 233 and 234, the former on the shaft 232 and the latter on the timing shaft 70, from which the power to effect the continuous rotation of the feed rolls 226, and as transmitted through the gearing just described, is obtained. These driving and rotative movements being continuous, and it being recognized that it would not be practical or operative to correspondingly feed the tie or stay wiring to the machine, it becomes necessary in this instance to insure an intermittent feed of the wiring from the continuous drive referred to. The means therefor comprises the special formation of each and all of the feed rollers 226, which are of uniform diameters in this instance, with endless peripheral or circumferential grooves having relatively narrow and shallow portions 235 opening at opposite circumferential ends to relatively wide and deep portions 236. Under this formation, it will be appreciated that the wiring seated in the grooves of the rollers 226 between the same and the presser rolls 227, when in the shallow portions 235, will project slightly for their binding between the walls of the grooves 235 and the opposing presser rollers 227; but when the rollers 226 have turned to a position where the wiring enters the wider and deeper portions 236, there will be no frictional feeding of the wire in the groove and the wire will be freely accommodated by the depth thereof, so as not to be frictionally engaged by the cooperating presser rolls 227, the rollers 226 simply slipping past the wire, for the time being. This interval of slip will, of course, be commensurate with the time consumed in the cutting and twisting of the tie or stay wires to the line wires, all as hereinabove described.

The type of fencing produced by the feed mechanism now under discussion is illustrated by full and dotted lines in Fig. 38.

Having in mind the fact that the various locations and relationships of the series of twisting mechanisms and related features of the machine require that the feeding of the wiring from which the stays or ties are to be formed must be regulated in keeping therewith, and recalling that the diameters of the feed rollers 226 are equal, the different extents of feed or advancement of the wiring is accomplished by accordingly varying the lengths of the relatively shallow and relatively deep portions of the grooves in each of these rollers with reference to the similar grooving of the other rollers of the series. As clearly seen in the illustration of Figure 42, the relatively deep portions of the grooves 236 are gradually decreased in circumferential extent from right to left of the series, so that the relatively shallow portions 235 of the grooves are correspondingly increased in their extent from right to left of the machine, whereby there is a progressive corresponding greater length of feed of the wires from right to left of the series. The effect of this arrangement of the grooves of the rollers of a uniform-diameter series may be likened to the general character of variable feed accomplished by the rollers of progressively increasing diameters, as in the case of the series of rollers illustrated in the first mentioned embodiment of the invention, shown in Figure 21.

While refinements and details have been particularly pointed out in the foregoing specification, the purpose is to present, for full understanding, a machine possessing the preferred embodiments of our present invention; and it is to be noted that various modifications in parts and arrangements thereof, constituting still other embodiments of the invention, may be resorted to without departing from the spirit of the invention as pointed to and set forth in the hereto-appended claims.

We claim:

1. Wire feeding means for a fence forming machine comprising a pair of cooperating rollers, means for rotating one of said rollers, means for creating yieldable peripheral pressure between said rollers, one of said rollers having a peripheral groove for the accommodation of a wire introduced between the rollers, said groove having a portion coacting with the opposite roller to frictionally engage and feed the wire, and having a continuing portion freeing the wire from said frictional engagement to stop the feed of the wire during part of the rotation of the rollers.

2. Wire feeding means for a fence forming machine comprising a pair of cooperating rollers, means for rotating one of said rollers, and means for yieldably pressing the other of said rollers towards said rotated roller, one of said rollers having a peripheral groove for the reception of a wire introduced between the rollers in position to be seated and fed thereby, said groove having a relatively shallow portion to insure frictional hold and feed of the wire by the engagement of said wire between the wall of said relatively shallow portion and the periphery of said opposite roller, and said groove also having a relatively widened and deepened portion to accommodate the wire in avoiding frictional engagement and feed of the wire during part of the rotation of the rollers.

3. Wire feeding means for a fence forming machine comprising a pair of cooperating rollers, means for rotating one of said rollers, and means for yieldably pressing the other of said rollers towards said rotated roller, one of said rollers having a peripheral groove for the reception of a wire introduced between the rollers in position to be seated and fed thereby, said groove having a relatively shallow portion to insure frictional hold and feed of the wire by the engagement of said wire between the wall of said relatively shallow portion and the periphery of said opposite roller, and said groove also having a relatively deepened portion to accommodate the wire in avoiding frictional engagement and feed of the wire during part of the rotation of the rollers.

4. Wire feeding means for a fence forming machine comprising a series of feed rollers, a cooperating series of opposed rollers, the rollers of one series having endless peripheral grooves, and a pair of supplemental opposing rollers, one of which also has a peripheral groove of varying size at different portions thereof, means for intermittently rotating all of said grooved rollers, means for creating yieldable peripheral pressure between all of said opposing rollers and the grooved rollers to coact in receiving and binding wires therebetween, the first mentioned series of grooved rollers being adapted to continually bind said wires, and the grooved roller having the varying peripheral groove allowing for non-feeding of the wire at predetermined points in the intermittent rotation of all of the grooved rollers.

5. Wire feeding means for a fence forming machine comprising two pairs of cooperating rollers arranged to receive wires therebetween, means for creating yieldable peripheral pressure between the rollers of each pair and means for positively driving one roller of each pair of rollers to impart intermittent rotation at regular intervals to the rollers, one pair of rollers being formed to continually grip the wire introduced therebetween for feeding thereof, one of the rollers of the other pair of rollers having a peripheral groove for the accommodation of its wire, said groove having a portion coacting with its opposing roller to frictionally engage and feed said wire and having a continuing portion freeing the wire from said frictional engagement to stop the feed of this particular wire during part of the rotation of the rollers, the different portions of the groove of the grooved roller being proportioned whereby the intermittent rotating means will obtain the same extent of feed of the wire engaged by the feeding portion of said grooved roller as the feed of the wire of the other pair of rollers during any feeding interval thereof.

6. Wire feeding means for a fence forming machine comprising two pairs of cooperating rollers arranged to receive wires therebetween, means for creating yieldable peripheral pressure between the rollers of each pair and means for positively driving one roller of each pair of rollers to impart intermittent rotation at regular intervals to the rollers, one pair of rollers being correlated to provide uniform peripheral portions constantly confining and gripping the wire introduced therebetween for feeding said wire under all rotative movements of said pair of rollers, one of the rollers of the other pair of rollers having a peripheral groove for the accommodation of its wire, said groove having a portion coacting with its opposing roller to frictionally engage and feed said wire and having a continuing portion freeing the wire from said frictional engagement to stop the feed of this particular wire during part of the rotation of the rollers, the different portions of the groove of the grooved roller being proportioned whereby the intermittent rotating means will obtain the same extent of feed of the wire engaged by the feeding portion of said grooved roller as the feed of the wire of the other pair of rollers during any feeding interval thereof.

7. Wire feeding means for a fence forming machine comprising a plurality of pairs of cooperating rollers, means for rotating one of the rollers of each pair, means for creating peripheral pressure between the rollers of each pair, one roller of each pair having a peripheral groove for the accommodation of wires introduced between the rollers, said groove having a portion coacting with the opposite roller of its pair to frictionally engage and feed its wire, and having a continuing portion freeing the wire from said frictional engagement to stop the feed of the wire during part of the rotation of the rollers, the grooved portions in the respective rollers varying from the grooved portions in the other rollers to obtain variable extent of feed of the wires between the respective pairs of rollers.

8. Wire feeding means for a fence forming machine comprising a plurality of pairs of cooperating rollers, means for rotating one of the rollers of each pair, means for creating peripheral pressure between the rollers of each pair, one roller of each pair having a peripheral groove for the accommodation of wires introduced between the rollers, said groove having a portion coacting with the opposite roller of its pair to frictionally engage and feed its wire, and having a continuing portion freeing the wire from said frictional engagement to stop the feed of the wire during part of the rotation of the rollers, the grooved portions in the respective rollers varying from the grooved portions in the other rollers to obtain variable extent of feed of the wires between the respective pairs of rollers, the grooved rollers being respectively of uniform diameter.

9. Wire feeding means for a fence forming machine comprising a plurality of pairs of cooperating rollers, means for rotating one of the rollers of each pair, means for creating peripheral pressure between the rollers of each pair, one roller of each pair having a peripheral groove for the accommodation of wires introduced between the rollers, said groove having a portion coacting with the opposite roller of its pair to frictionally engage and feed its wire, and having a continuing portion freeing the wire from said frictional engagement to stop the feed of the wire during part of the rotation of the rollers, the grooved portions in the respective rollers varying from the grooved portions in the other rollers to obtain variable extent of feed of the wires between the respective pairs of rollers, and said means for rotating one of the rollers of each pair comprising a continuous drive connected to said rollers to correspondingly continuously drive the same.

10. Wire feeding means for a fence forming machine comprising a plurality of pairs of cooperating rollers, means for rotating one of the rollers of each pair, means for creating peripheral pressure between the rollers of each pair, one roller of each pair having a peripheral groove for the accommodation of wires introduced between the rollers, said groove having a portion coacting with the opposite roller of its pair to frictionally engage and feed its wire, and having a continuing portion freeing the wire from said frictional engagement to stop the feed of the wire during part of the rotation of the rollers, the grooved portions in the respective rollers varying from the grooved portions in the other rollers to obtain variable extent of feed of the wires between the respective pairs of rollers, the grooved rollers being respectively of uniform diameter, and said means for rotating one of the rollers of each pair comprising a continuous drive connected to said rollers to correspondingly continuously drive the same.

11. Feeding mechanism for wiring in a fence making machine, including a pair of rollers between which wires are introduced and advanced by frictional engagement therewith, and means for effecting rotation of the rollers, one of the rollers being peripherally grooved to present adjoining relatively shallow and relatively deep portions extended circumferentially of the roller to effect gripping of the wire between the opposing roller and the base of said shallow portion of the groove and a slippage of the rollers past the wire at said relatively deep portion, the formation of the grooved roller being such as to effect successive periods of feed and lulls in the feed of the wire during a complete rotation of the roller.

12. Feeding mechanism for wiring in a fence making machine, including a pair of rollers between which wires are introduced and advanced by frictional engagement therewith, and means for effecting rotation of the rollers, one of the rollers being peripherally grooved to present adjoining relatively shallow and relatively deep portions extended circumferentially of the roller to effect gripping of the wire between the opposing roller and the base of said shallow portion of the groove and a slippage of the rollers past the wire at said relatively deep portion, the formation of the grooved roller being such as to effect advance of the wire during one half of its revolution and a lull in such advancement during the other half of its revolution.

13. Feeding mechanism for wiring in a fence making machine, including a pair of rollers between which wires are introduced and advanced by frictional engagement therewith, and means for effecting rotation of the rollers, one of the rollers being peripherally grooved to present adjoining relatively shallow and relatively deep portions extended circumferentially of the roller to effect gripping of the wire between the opposing roller and the base of said shallow portion of the groove and a slippage of the rollers past the wire at said relatively deep portion, the deeper portion of the grooved roller extending around the latter to an extent somewhat greater than the extent that the shallow portion extends therearound to compensate for the approach and recession of the base of said shallow portion relatively to the wire and opposing roller so as to effect advance of the wire during one half revolution of the roller and a lull in such advancement during the other half of its revolution.

14. In a wire fence forming machine, twisting mechanism for wires, wire feeding means, wire severing means, separate devices for positioning the wires to be twisted with reference to the twisting means, a separate actuator for each of the positioning devices for moving them through independent rectilineal paths toward and from the twisting means.

15. In a wire fence forming machine, twisting mechanism for wires, wire feeding means, wire severing means, separate devices for positioning the wires to be twisted with reference to the twisting means, a separate actuator for each of the positioning devices for moving them through independent rectilineal paths toward and from the twisting means, and other means for independently actuating the severing means.

16. In a wire fence forming machine, twisting mechanism for wires, wire feeding means, wire severing means, separate devices for positioning the wires to be twisted with reference to the twisting means, a separate actuator for each of the positioning devices for moving them through independent rectilineal paths toward and from the twisting means, the rectilineal paths of movement of the positioning devices converging towards the twisting means.

17. In a wire fence forming machine, twisting mechanism for wires, wire feeding means, wire severing means, separate devices for positioning the wires to be twisted with reference to the twisting means, a separate actuator for each of the positioning devices for moving them through independent rectilineal paths toward and from the twisting means, in combination with guides for the positioning devices mounted in adjacence to the wires to be twisted and the twisting mechanism.

18. In a wire fence forming machine, twisting mechanism for wires, wire feeding means, wire severing means, separate devices for positioning the wires to be twisted with reference to the twisting means, a separate actuator for each of the positioning devices for moving them through independent rectilineal paths toward and from the twisting means, the rectilineal paths of movement of the positioning devices converging towards the twisting means, in combination with guides for the positioning devices mounted in adjacence to the wires to be twisted and the twisting mechanism.

19. In a wire fence forming machine, twisting mechanism, feeding means for wires to be twisted, positioning means for locating a wire in operative association with the twisting mechanism, means located remotely from the twisting mechanism for moving the positioning means towards and from the same, and means immediately adjacent the twisting mechanism engaging the inner operating portion of the positioning means for maintaining the positioning means against displacement relative to the wire to be twisted and the twisting mechanism.

20. In a wire fence forming machine, twisting mechanism, feeding means for wires to be twisted, positioning means movable in paths from opposite directions towards and from the wires to be twisted to locate them in operative association with the twisting mechanism, and individual means engageable with each of the wire engageable portions of the positioning means to confine them against lateral displacement and means for actuating the positioning means.

21. In a wire fence forming machine, twisting mechanism, feeding means for wires to be twisted, positioning means movable in paths from opposite directions towards and from the wires to be twisted to locate them in operative association with the twisting mechanism, and individual means engageable with each of the wire engageable portions of the positioning means to confine them against lateral displacement and means for actuating the positioning means, the positioning means having elongated shank portions and said actuating means being connected to the outer ends of said shank portions and remotely mounted with reference to the twisting zone of operation.

22. In a wire fence forming machine, twisting mechanism, feeding means for wires to be twisted, positioning means movable in paths towards and from the wires to be twisted to locate them in operative association with the twisting mechanism, and individual means engageable with each of the wire engageable portions of the positioning means to confine them against lateral displacement and means for actuating the positioning means.

23. In a wire fence forming machine, twisting mechanism, feeding means for wires to be twisted, positioning means movable in paths from opposite directions towards and from the wires to be twisted to locate them in operative association with the twisting mechanism, and means engageable with the wire engageable portions of the positioning means to confine them against lateral displacement and separate actuators for the positioning means, the positioning means having elongated shank portions and said actuators being connected to the outer ends of said shank portions.

24. In a wire fence forming machine, twisting mechanism, feeding means for wires to be twisted, positioning means movable in paths from opposite directions towards and from the wires to be twisted to locate them in operative association with the twisting mechanism, and means engageable with the wire engageable portions of the positioning means to confine them against lateral displacement and independent cam mechanisms for actuating the positioning means, the positioning means having elongated shank portions and said cam mechanisms being connected to the outer ends of said shank portions.

25. In a wire fence forming machine, twisting mechanism, feeding means for wires to be twisted, positioning means movable in paths towards and from the wires to be twisted to locate them in operative association with the twisting mechanism, and means engageable with the wire engageable portions of the positioning means to confine them against lateral displacement and independent cam mechanisms for actuating the positioning means.

26. In a wire fence forming machine, twisting mechanism for wires, wire feeding means, wire severing means, separate devices for positioning the wires to be twisted with reference to the twisting means, independent cam mechanisms for actuating the positioning devices to move them through independent rectilineal paths toward and from the twisting means.

27. In a wire fence forming machine, twisting mechanism for wires, wire feeding means, wire severing means, separate devices for positioning the wires to be twisted with reference to the twisting means, a separate actuator for each of the positioning devices for moving them through independent paths toward and from the twisting means.

28. In a wire fence forming machine, twisting mechanism for wires, wire feeding means, wire severing means, separate devices for positioning the wires to be twisted with reference to the twisting means, a separate actuator for each of the positioning devices for moving them through independent paths toward and from the twisting means, in combination with guides for the positioning devices mounted in adjacence to the wires to be twisted and the twisting mechanism.

29. In a wire fence forming machine, a guide block for wiring, a cutter, a cooperating cutter member, a fastening means for detachably securing said member to an end face of said block, the block and cooperating cutter member having aligned laterally closed bores for the longitudinal passage of the wire while restraining the same against lateral movement in any direction, said block and cutter member being also formed with interengageable portions to prevent relative movement on said fastening means and disalignment of said bores.

30. In a wire fence forming machine, a bolster, guiding means thereon for wiring to constitute stays comprising an integral block grooved across its upper face to receive one of the wires, means for temporarily retaining the wire in said groove during a twisting operation, line wire feeding means and twisting means to fabricate the fencing and a yieldable cover plate for the grooved portion of the block and wire therein adapted to open to permit escape of the wire and withdrawal of the fabricated fencing, said cover plate being hinged to the block adjacent to a recessed portion of the block formed inwardly thereof intermediate its ends and opening outwardly therefrom, and a spring secured and housed within said recess having a terminal portion extending upwardly out of the same and arranged to press downwardly upon the cover plate, an opposite terminal of the spring anchored against said bolster within said recessed portion of the block.

31. In a wire fence forming machine, twisting mechanism, feeding means for the wiring, and wire supporting and guiding means including a block mounted in adjacence to the twisting mechanism, a bolster for supporting said block, and means whereby the block may be adjusted with relation to said twisting mechanism and fastened to said bolster.

32. In a wire fence forming machine, twisting mechanism, feeding means for the wiring, and wire supporting and guiding means including a block disposed adjacent to the twisting mechanism, the latter being shifted towards or from said twisting mechanism, and fastening means for the block whereby the latter may be secured in any of its shifted positions with relation to said twisting mechanism.

33. In a wire fence forming machine, twisting mechanism, feeding means for the wiring, and wire supporting and guiding means including a block mounted in adjacence to the twisting mechanism, a bolster for supporting said block, and means whereby the block may be adjusted with relation to said twisting mechanism and fastened to said bolster, said adjusting means including a dove-tailed interfitting of the bolster and block together for relative shifting movement and locking means to prevent such movement.

34. In a wire fence forming machine, twisting mechanism, feeding means for the wiring, and wire supporting and guiding means including a block mounted in adjacence to the twisting mechanism, a bolster for supporting said block, and means whereby the block may be adjusted with relation to said twisting mechanism and fastened to said bolster, said adjusting means including a dove-tailed interfitting of the bolster and block together for relative shifting movement and locking means to prevent such movement comprising a wedge interposed between relatively inclined faces of the bolster and block, and means for forcing the wedge in binding relationship to the bolster and block.

35. In a wire fence forming machine, twisting mechanism, feeding means for the wiring, and wire supporting and guiding means including a block mounted in adjacence to the twisting mechanism, a bolster for supporting said block formed with a rail dove-tailed in cross-section, the block having a correspondingly shaped flange at one end interfitting with an opposing edge of said rail and the opposite edge of the block having a flange spaced from the adjacent edge of the rail, a wedge interposed between the last mentioned flange and the opposing inclined edge of the rail, and means for forcing the wedge home to bind the rail, block and wedge together as a rigid unit and in adjusted relationship to the twisting mechanism.

36. In a wire fence forming machine, twisting mechanism including wire positioning devices, feeding means for the wiring, wire supporting and guiding means including a block mounted adjacent to the twisting mechanism, a bolster supporting said block, and guides, one mounted on said bolster and the other on said block, for said positioning devices.

37. In a wire fence forming machine, twisting mechanism including wire positioning devices, feeding means for the wiring, wire supporting and guiding means including a block mounted adjacent to the twisting mechanism, a bolster supporting said block, and adjustable guides, one mounted on said bolster and the other on said block, for said positioning devices.

38. In a wire fence forming machine, twisting mechanism including wire positioning devices, feeding means for the wiring, wire supporting and guiding means including a block mounted adjacent to the twisting mechanism, a bolster supporting said block, and adjustable guides, one mounted on said bolster and the other on said block, for said positioning devices, in combination with means for adjusting the position of the block and fastening the same to the bolster.

39. In a wire fence forming machine, twisting mechanism including wire positioning devices, feeding means for the wiring, wire supporting and guiding means including a block mounted adjacent to the twisting mechanism, a bolster supporting said block and adjustable guides, one mounted on said bolster and the other on said block, for said positioning devices, in combination with means for adjusting the position of the block and fastening the same to the bolster and wire severing means cooperatively associated with the block.

40. In a wire fence forming machine, twisting mechanism, wire feeding means, wire positioning members having their wire engaging ends converging towards the twisting mechanism, a cam actuator for each of said members cooperatively associated with the other ends thereof, and means for actuating said cams including parallel shafts on which the cams are mounted, sprockets on said shafts and a driven sprocket chain having a run bridging said sprockets.

41. In a wire fence forming machine, twisting mechanism, wire feeding means, wire positioning members having their wire engaging ends extended towards the twisting mechanism, a cam actuator for each of said members cooperatively associated with the other ends thereof, and means for actuating said cams including shafts on which the cams are mounted, sprockets on said shafts and a driven sprocket chain having a run bridging said sprockets.

42. In a wire fence forming machine, twisting mechanism, wire feeding means, wire positioning members having their wire engaging ends extended towards the twisting mechanism, an actuator for each of said members cooperatively associated with the other ends thereof, and means for operating said actuators including shafts on which the actuators are connected, sprockets on said shafts and a driven sprocket chain having a run bridging said sprockets.

43. Wire feeding means for a fence forming machine comprising a series of feed rollers, a cooperating series of opposed rollers, the rollers of one series having endless peripheral grooves, and a pair of supplemental opposing rollers, one of which also has a peripheral groove of varying size at different portions thereof, means for intermittently rotating all of said grooved rollers, means for creating yieldable peripheral pressure between all of said opposing rollers and the grooved rollers to coact in receiving and binding wires therebetween, the first mentioned series of grooved rollers being adapted to continually bind said wires, and the grooved roller having the varying peripheral groove allowing for non-feeding of the wire at predetermined points in the intermittent rotation of all of the grooved rollers, the intermittent feed being adapted to advance the wires by the endlessly grooved rollers, in each step of their rotation a definite extent corresponding to the extent of rotation of the rollers, and the portions of varying size of the supplemental grooved roller having different depths proportioned as to their circumferential extent as to insure their gripping of its wire and advance thereof during the same degree of rotation of this roller as said first mentioned degree of rotation of the other rollers.

44. Wire feeding means for a fence forming machine comprising a series of feed rollers, a cooperating series of opposed rollers, the rollers of one series having endless peripheral grooves, said rollers progressively increasing in diameter throughout the series of rollers, and a pair of supplemental opposing rollers, one of which also has a peripheral groove of varying size at different portions thereof, means for intermittently rotating all of said grooved rollers, means for creating yieldable peripheral pressure between all of said opposing rollers and the grooved rollers to coact in receiving and binding wires therebetween, the first mentioned series of grooved rollers being adapted to continually bind said wires, and the grooved roller having the varying peripheral groove allowing for non-feeding of the wire at predetermined points in the intermittent rotation of all of the grooved rollers.

45. Wire feeding means for a fence forming machine comprising a series of feed rollers, a cooperating series of opposed rollers, the rollers of one series having endless peripheral grooves, said rollers progressively increasing in diameter throughout the series of rollers, and a pair of supplemental opposing rollers, one of which also has a peripheral groove of varying size at different portions thereof, means for intermittently rotating all of said grooved rollers, means for creating yieldable peripheral pressure between all of said opposing rollers and the grooved rollers to coact in receiving and binding wires therebetween, the first mentioned series of grooved rollers being adapted to continually bind said wires, and the grooved roller having the varying peripheral groove allowing for non-feeding of the wire at predetermined points in the intermittent rotation of all of the grooved rollers, the intermittent feed being adapted to advance the wires by the endlessly grooved rollers, in each step of their rotation a definite extent corresponding to the extent of rotation of the rollers, and the portions of varying size of the supplemental grooved roller having different depths proportioned as to their circumferential extent as to insure their gripping of its wire and advance thereof during the same degree of rotation of this roller as said first mentioned degree of rotation of the other rollers.

46. Wire feeding means for a fence forming machine comprising a series of feed rollers, a cooperating series of opposed rollers, the rollers of one series having peripheral grooves, said rollers being of uniform diameter throughout the series, and said grooves being of varying size at different portions thereof, means for rotating all of said grooved rollers, means for creating yieldable peripheral pressure between said first mentioned rollers and said grooved rollers to coact in receiving and binding wires therebetween during certain parts of the rotation of the rollers and to free the wires to prevent feed during other parts of said rotation, the circumferential extent of the varying sized portions of the grooves of the rollers differing in the respective rollers as compared to similar portions of the other grooved rollers of the series to correspondingly regulate the different extents of advancement of wires of the series under the binding and feeding phases of rotation of the rollers.

47. In a wire fence forming machine, twisting mechanism including a hollow spindle providing a conducting passage for wiring, means for rotating the same, a detachable twister head inserted in and having interlocking engagement with an end portion of said spindle, said head having other wire engaging portions and a contracted bore therethrough constituting a continuation of the wire passage through the hollow spindle, the inner end of said head having a flared inlet to its bore to guide an incoming wire introduced through the spindle into the bore of the head.

48. In a wire fence forming machine, wire twisting mechanism including a twister head and means for rotating the same, said twister head having a groove in its upper end with parallel walls extending transversely of said end, said walls being under-cut at diagonally opposite end portions only thereof to provide corresponding overhanging ledges to form tangentially disposed pockets for confining wire terminals, the intermediate wall portions being straight to enable free escape of twisted wire portions from the head.

49. In a wire fence forming machine, wire twisting mechanism including a twister head and means for rotating the same, said twister head having a groove in its upper end with parallel walls extending transversely of said end, said walls being under-cut at diagonally opposite end portions only thereof to provide corresponding overhanging ledges to form corresponding diagonally disposed pockets for confining wire terminals, the intermediate wall portions being straight to enable free escape of twisted wire portions from the head.

50. In a wire fence forming machine, wire twisting mechanism including a twister head and means for rotating the same, said twister head having a groove in its upper end with parallel walls extending transversely of said end, said walls being under-cut at diagonally opposite end portions only thereof to provide corresponding overhanging ledges to form tangentially disposed pockets for confining wire terminals, the intermediate wall portions being straight to enable free escape of twisted wire portions from the pockets inclining from the outer edge of the head inwardly towards the center of the head to provide surfaces over which the ends of said wire terminals will ride and be deflected out of said pockets into said straight wall portion of the groove as said terminals shorten in a twisting operation.

51. In a wire fence forming machine, wire twisting mechanism including a twister head and means for rotating the same, said twister head having a groove in its upper end with parallel walls extending transversely of said end, said walls being under-cut at diagonally opposite end portions only thereof to provide corresponding overhanging ledges to form corresponding diagonally disposed pockets for confining wire terminals, the intermediate wall portions being straight to enable free escape of twisted wire portions from the head and the bottoms of the pockets inclining from the outer edge of the head inwardly towards the center of the head to provide surfaces over which the ends of said wire terminals will ride and be deflected out of said pockets into said straight wall portion of the groove as said terminals shorten in a twisting operation.

52. In a wire fence forming machine, wire twisting mechanism including a tubular twister head and means for rotating the same, said twister head having a groove in its upper end arranged between centrally disposed straight parallel wall portions extending across said end opening to laterally enlarged end recesses providing diagonally disposed pockets for confining wire terminals.

53. In a wire fence forming machine, wire twisting mechanism including a tubular twister head and means for rotating the same, said twister head having a groove in its upper end arranged between centrally disposed straight parallel wall portions extending across said end opening to laterally enlarged end recesses providing diagonally disposed pockets for confining wire terminals, the bottoms of the pockets inclined from the outer edge of the head inwardly toward the center of the head.

54. In a wire fence forming machine, wire twisting mechanism including a tubular twister head and means for rotating the same, said twister head having a groove in its upper end arranged between centrally disposed straight parallel wall portions extending across said end opening to laterally enlarged end recesses providing diagonally disposed pockets for confining wire terminals, the bottoms of the pockets inclined from the outer edge of the head inwardly toward the center of the head and extending in lines tangentially of the tubular head.

55. In a wire fence forming machine, wire twisting mechanism including a tubular twister head and means for rotating the same, said twister head having a groove in its upper end arranged between centrally disposed straight parallel wall portions extending across said end opening to laterally enlarged end recesses providing diagonally disposed pockets for confining wire terminals, and adjoining surfaces of the groove and pocket forming portions of the head merging together and the ends of the grooved portion inclining away from the outer end of the head to permit the wire terminals to be depressed in a direction longitudinally of the head.

56. In a wire fence forming machine, wire twisting mechanism including a tubular twister head and means for rotating the same, said twister head having a groove in its upper end arranged between centrally disposed straight parallel wall portions extending across said end opening to laterally enlarged end recesses providing diagonally disposed pockets for confining wire terminals, the bottoms of the pockets inclined from the outer edge of the head inwardly toward the center of the head, and adjoining surfaces of the groove and pocket forming portions of the head merging together and the ends of the grooved portion inclining away from the outer end of the head to permit the wire terminals to be depressed in a direction longitudinally of the head.

57. In a wire fence forming machine, wire twisting mechanism including a tubular twister head and means for rotating the same, said twister head having a groove in its upper end arranged between centrally disposed straight parallel wall portions extending across said end opening to laterally enlarged end recesses providing diagonally disposed pockets for confining wire terminals, the bottoms of the pockets inclined from the outer edge of the head inwardly toward the center of the head and extending in lines tangentially of the tubular head, and adjoining surfaces of the groove and pocket forming portions of the head merging together and the ends of the grooved portion inclining away from the outer end of the head to permit the wire terminals to be depressed in a direction longitudinally of the head.

58. In a wire fence forming machine, fabric pull-up mechanism including a drum to engage the fabric, supporting and guiding means permitting to-and-fro movement of the drum, and means for obtaining said to-and-fro movement of the drum including a pitman operatively associated at one end with the drum and means for reciprocating said pitman comprising concentrically nested cam members, a strap surrounding the same and connected to the other end of the pitman and means for imparting unitary rotation to said cam members.

59. In a wire fence forming machine, fabric pull-up mechanism including a drum to engage the fabric, supporting and guiding means permitting to-and-fro movement of the drum, and means for obtaining said to-and-fro movement of the drum including a pitman operatively associated at one end with the drum and means for reciprocating said pitman comprising concentrically nested cam members, a strap surrounding the same and connected to the other end of the pitman and means for imparting unitary rotation to said cam members, said cam members being axially separable to change the relationship of their combined contours with respect to the strap and having means to rigidly secure them together in adjusted position.

60. In a wire fence forming machine, fabric pull-up mechanism including a drum to engage the fabric, supporting and guiding means permitting to-and-fro movement of the drum, and means for obtaining said to-and-fro movement of the drum including a pitman operatively associated at one end with the drum and means for reciprocating said pitman comprising concentrically nested cam members, a strap surrounding the same and connected to the other end of the pitman and means for imparting unitary rotation to said cam members, said cam members being axially separable to change the relationship of their combined contours with respect to the strap and having means to rigidly secure them together in adjusted position, said last mentioned means comprising wedge bolts and cooperating elements introduced transversely of the cam members adapted to forcibly bind them together.

61. In a wire fence forming machine, fabric pull-up mechanism including a drum to engage the fabric, supporting and guiding means permitting to-and-fro movement of the drum, and means for obtaining said to-and-fro movement of the drum including a pitman operatively associated at one end with the drum and means for reciprocating said pitman comprising concentrically nested cam members, a strap surrounding the same and connected to the other end of the pitman and means for imparting unitary rotation to said cam members, said cam members being axially separable to change the relationship of their combined contours with respect to the strap and having means to rigidly secure them together in adjusted position, said last mentioned means comprising wedge bolts and cooperating elements introduced transversely of the cam members adapted to forcibly bind them together, the wedge bolts interengaging with grooved opposite edges of the cam members to provide a positive interlock therebetween.

62. In a wire fence forming machine, fabricating instrumentalities, a driven roll on which the finished fabricated product is wound, a friction drive for said roll including a belt, and means for positively tensioning said friction drive comprising a support, a roller having a bearing slidably mounted in said support to variably engage the roller with said belt to correspondingly deflect the belt and tension the same, and means for positively positioning and maintaining the position of the roller with relation to the belt including a toothed rack on the support, a pinion operatively associated with the roll and its bearing and engaging said rack, and means for rotating the pinion to effect an advance or recession of the roll relative to the belt combined with means for retaining said rotating means in any of its adjusted positions.

63. In a wire fence forming machine, fabricating instrumentalities, a driven roll on which the finished fabricated product is wound, a friction drive for said roll including a belt, and means for positively tensioning said friction drive comprising a support, a roller having a bearing slidably mounted in said support to variably engage the roller with said belt to correspondingly deflect the belt and tension the same, and means for positively positioning and maintaining the position of the roller with relation to the belt including a toothed rack on the support, a pinion operatively associated with the roll and its bearing and engaging said rack, and means for rotating the pinion to effect an advance or recession of the roll relative to the belt.

64. In a wire fence forming machine, fabricating instrumentalities located forwardly of the machine, a driven roll on which the finished fabricated product is wound at the rear of the machine, a friction drive for said roll including a belt at one side of the machine, and means for positively tensioning said friction drive comprising a support, a roller having a bearing slidably mounted in said support to variably engage the roller with said belt to correspondingly deflect the belt and tension the same, and means for positively positioning and maintaining the position of the roller with relation to the belt including a toothed rack on the support, a pinion operatively associated with the roll and its bearing and engaging said rack, and means extending within easy access of an operator at the forward end of the machine for rotating the pinion to effect an advance or recession of the roll relative to the belt.

65. In a wire fence forming machine, fabricating instrumentalities located forward of the machine, a driven roll on which the finished fabricated product is wound at the rear of the machine, a friction drive for said roll including a belt at one side of the machine, and means for positively tensioning said friction drive comprising a support, a roller having a bearing slidably mounted in said support to variably engage the roller with said belt to correspondingly deflect the belt and tension the same, and means for positively positioning and maintaining the position of the roller with relation to the belt including a toothed rack on the support, a pinion operatively associated with the roll and its bearing and engaging said rack, and means extending within easy access of an operator at the forward end of the machine for rotating the pinion to effect an advance or recession of the roll relative to the belt combined with means for securing said rotating means in any of its adjusted positions.

66. In a wire fence forming machine, fabricating means, means including a roll for withdrawing and winding the fabricated material in roll formation, means for driving said roll including strongly tensioned friction instrumentalities correspondingly exerting a strong pull and highly tensioning the fabricated material as it nears the winding roll, in combination with means permitting the driving means to continue its normal movement while momentarily relaxing the tension of the fabricated material to facilitate shearing the same to free wound roll material from the balance of the material in the machine.

JOHN B. GETZ.
JOHN H. LEADER.